(12) United States Patent
Agazzi et al.

(10) Patent No.: US 7,913,127 B2
(45) Date of Patent: *Mar. 22, 2011

(54) DIAGNOSTICS OF CABLE AND LINK PERFORMANCE FOR A HIGH-SPEED COMMUNICATION SYSTEM

(75) Inventors: Oscar E. Agazzi, Irvine, CA (US); Kenneth Phan Hung, Anaheim, CA (US); David I. Sorensen, Scotts Valley, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/751,778

(22) Filed: Mar. 31, 2010

(65) Prior Publication Data

US 2010/0192028 A1 Jul. 29, 2010

Related U.S. Application Data

(63) Continuation of application No. 12/072,359, filed on Feb. 26, 2008, now Pat. No. 7,711,999, which is a continuation of application No. 11/024,547, filed on Dec. 29, 2004, now Pat. No. 7,337,375, which is a continuation of application No. 09/693,232, filed on Oct. 19, 2000, now Pat. No. 6,898,185.

(60) Provisional application No. 60/160,502, filed on Oct. 20, 1999.

(51) Int. Cl.
*G01R 31/3193* (2006.01)
*G01R 31/40* (2006.01)

(52) U.S. Cl. ........................................ 714/712; 714/732
(58) Field of Classification Search ........................ None
See application file for complete search history.

(56) References Cited

U.S. PATENT DOCUMENTS

| | | |
|---|---|---|
| 4,547,633 A | 10/1985 | Szechenyi |
| 4,951,269 A | 8/1990 | Amano et al. |
| 5,099,436 A | 3/1992 | McCown et al. |
| 5,347,524 A | 9/1994 | I'Anson et al. |
| 5,351,247 A | 9/1994 | Dow et al. |
| 5,553,272 A | 9/1996 | Ranganathan et al. |
| 5,631,757 A * | 5/1997 | Bodeep et al. ............... 398/138 |
| 5,636,244 A | 6/1997 | Goodson et al. |

(Continued)

FOREIGN PATENT DOCUMENTS
WO  WO 92/12493  7/1992

OTHER PUBLICATIONS

Bellanger, M.G., "Adaptive Digital Filters and Signal Analysis", XP002170144, pp. 313-314 (1987).

*Primary Examiner* — Cynthia Britt
*Assistant Examiner* — Dipakkumar Gandhi
(74) *Attorney, Agent, or Firm* — McAndrews, Held & Malloy, Ltd.

(57) ABSTRACT

A method and system for performing diagnostic tests on a real-time system controlled by a state machine. A sequence of states recorded as the state machine operates is used to determine error conditions. The sequence of states is compared to expected sequences of states to determine what, if any, errors have occurred. If the real-time system, such as a transceiver in a communication system, has adaptive components, the status of the adaptive components is used to estimate the condition of any external systems coupled to the real-time system.

20 Claims, 22 Drawing Sheets

U.S. PATENT DOCUMENTS

| | | | |
|---|---|---|---|
| 5,661,668 A | 8/1997 | Yemini et al. | |
| 5,990,687 A | 11/1999 | Williams | |
| 6,006,344 A * | 12/1999 | Bell, Jr. | 714/37 |
| 6,032,209 A * | 2/2000 | Mros et al. | 710/302 |
| 6,445,733 B1 | 9/2002 | Zuranski et al. | |
| 6,898,185 B1 | 5/2005 | Agazzi et al. | |
| 7,711,999 B2 * | 5/2010 | Agazzi et al. | 714/724 |

* cited by examiner

Expected Patterns

System Fails To Initialize
AABBBBBCCAABBBBBCCAABBBBBCC... ~ 2165

System Initialized
AABBDDHHH... ~2170

FIG. 3

State Machine Sequence
ABBBBDDHH ~2600

Approximate String Matching

System Initialized
AABBBBDDHH ~2610
010001010 ~2620
ABBBBBDDH ~2600
Distance = 3 ~2625

System Not Initialized
AABBBBBBC ~2615
010000111 ~2630
ABBBBBDDH ~2600
Distance = 4 ~2635

FIG. 8

```
        AABBBBDDHH ~2610
        0123456789  ~2700
    A  1013456789
    B  2112226789
    B  3321223789   ~2760
    B  4432123489
    B  5553213459
    B  6665322456
    D  7776422256
    D  8888874236
    H  9999985333    ~2720
```
2600~     ~2710
          ~2740

FIG. 9

DIAGNOSTICS OF CABLE AND LINK PERFORMANCE FOR A HIGH-SPEED COMMUNICATION SYSTEM

CROSS-REFERENCE TO RELATED APPLICATIONS

The present application is a CONTINUATION of U.S. application Ser. No. 12/072,359, filed Feb. 26, 2008, which is a CONTINUATION of U.S. application Ser. No. 11/024,547, filed Dec. 29, 2004, now issued U.S. Pat. No. 7,337,375, which is a CONTINUATION of U.S. application Ser. No. 09/693,232, filed Oct. 19, 2000, now issued U.S. Pat. No. 6,898,185, which claims benefit from and priority to U.S. Provisional Application No. 60/160,502, filed Oct. 20, 1999. The above-identified applications are hereby incorporated by reference herein in their entirety.

REFERENCE TO A MICROFICHE APPENDIX

The present specification includes two microfiche containing computer source code and source code specification referred to in the specification as the Appendix A and Appendix B.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to the field of real-time systems and specifically to diagnosing error conditions in high-speed communication systems.

In many applications of real-time systems there is a need to identify conditions of coupled external systems. For example, in a high-speed communication system the characteristics of the communications channel such as length of the link, noise, and signal attenuation and distortion may be important factors affecting the quality of the system. There may be cases where channel impairments are so drastic that it is not possible to establish communication between or within systems. Quickly identifying the conditions resulting from a failure and the possible causes of channel impairments would allow the user of the communication system to take remedial action thus minimizing costs. Identifying and solving the problems that led to the failure would be greatly facilitated if the communication system itself had enough intelligence to diagnose the cause of a failure and report the cause to the user.

SUMMARY OF THE INVENTION

Error conditions in a real-time system controlled by state machines may be diagnosed by examining the sequence of states through which the state machines pass. A number of expected state machine sequences are generated by examining the design of the state machines. Each expected state machine sequence may correspond to the expected sequence of states through which the state machines pass during a particular error condition. These sequences are then compared to a state machine sequence generated by the controlling state machines during operation of the real-time system. If one of the expected state machine sequences matches the state machine sequence, then the error condition corresponding to the expected state machine sequence is reported as the status of the real-time system.

In an alternative embodiment, further diagnostics may be provided if the real-time system has adaptive components that are tuned in response to external systems. For example, in a communications device such as an Ethernet transceiver coupled to a transmission cable, there may be adaptive filters within the transceiver that compensate for the transmission characteristics of the cable. In this case, the values of the variable coefficients of the adaptive filters may be used to estimate the quality of the transmission cable.

The matching of the expected state machine sequences to the state machine sequence may be accomplished by a variety of algorithms. In one exemplary embodiment, the expected state machine sequences and the state machine sequence are treated as strings of characters. The number of editing steps required to transform the state machine sequence string into an expected state machine sequence string is used to determine if the state machine sequence matches an expected state machine sequence. The smaller the number of required editing steps to complete the transformation, the closer the match between the two strings. This type of algorithm is known as approximate string matching and is advantageously implemented using dynamic programming techniques.

The monitoring of the state machine controlling the real-time system may be accomplished in several ways. In one embodiment, the state machine itself stores the sequence of states in a data-store for further use. In another embodiment, a separate software process may be used to periodically sample and store the state the state machine is in. The expected state machine sequences may be normalized using the known sampling period so that the expected state machine sequences more closely resemble the sampled state machine sequence.

BRIEF DESCRIPTION OF THE DRAWINGS

These and other features, aspects, and advantages of the present invention will become better understood with regard to the following description, appended claims, and accompanying drawings where:

FIG. 3 depicts sequences of states created by the exemplary state machine during normal operation;

FIG. 8 is an illustration of how approximate string matching may be used to detect specific sequences in the state machine state sequences;

FIG. 9 is an illustration how a dynamic programming algorithm may be used to accomplish approximate string matching;

APPENDIX A is a microfiche containing computer source code specification diagrams; and APPENDIX B is a microfiche containing computer source code.

DETAILED DESCRIPTION OF THE INVENTION

Figure 1:
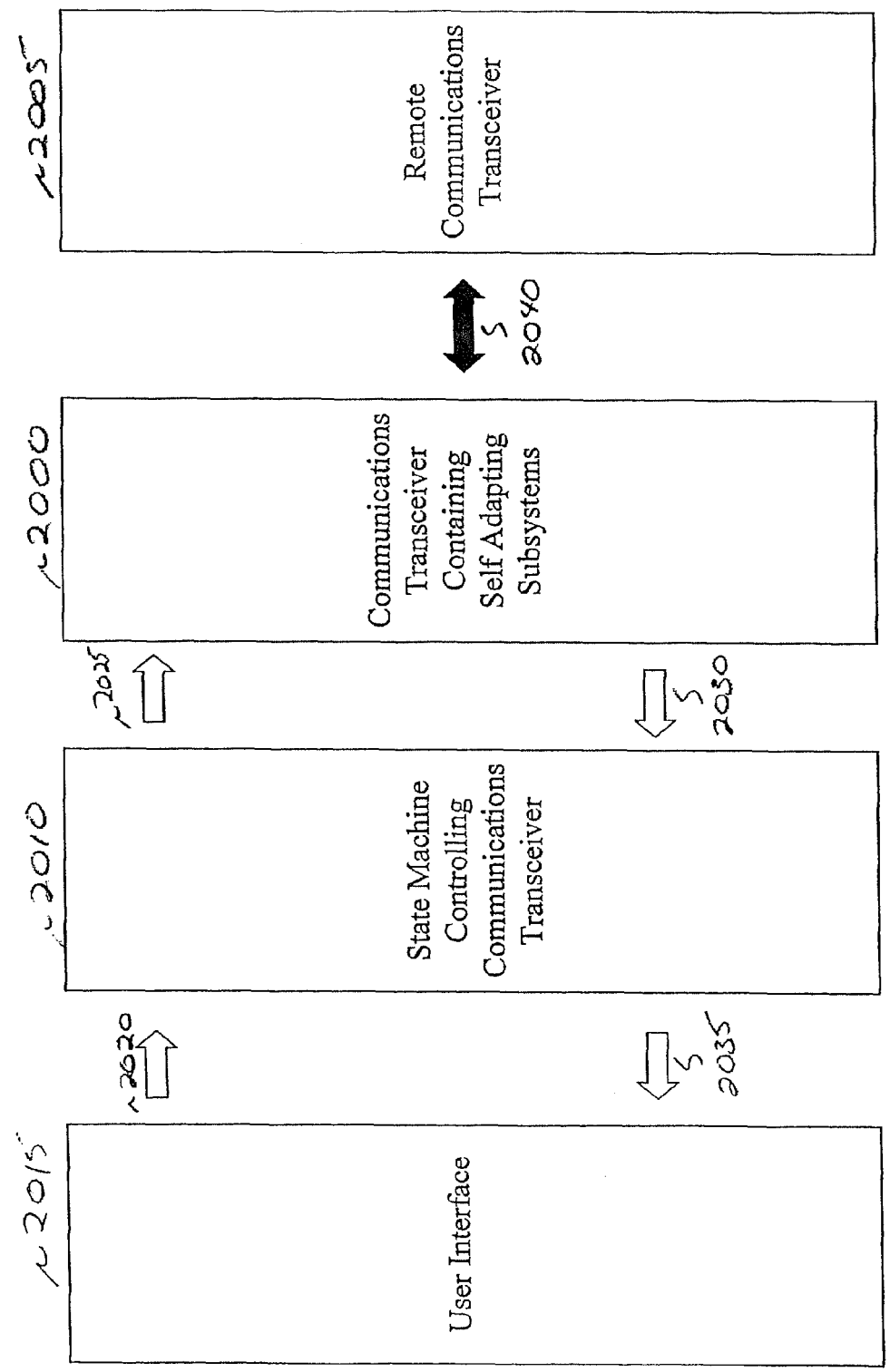
FIG. 1 is a schematic of a communications transceiver controlled by a state machine.

FIG. 1 is a schematic of an exemplary software architecture for a real-time system controlled by a state machine. The exemplary real-time system is a transceiver containing adaptive filters. Transceiver 2000 sends symbol data 2040 over a communications medium to external transceiver 2005. Transceiver 2000 is controlled using control commands 2025 sent from control state machine 2010. The control state machine in turn accepts responsive signals 2030 from the transceiver. The control state machine receives user command signals 2020 from user interface 2015. The control state machine sends responsive signals 2035 back to the user interface. The control state machine controls the initialization, start up, and operation of the transceiver. The control state machine operates autonomously of the user interface software most of the time. The control state machine only responds to user commands for a limited number of operations.

Figure 2:
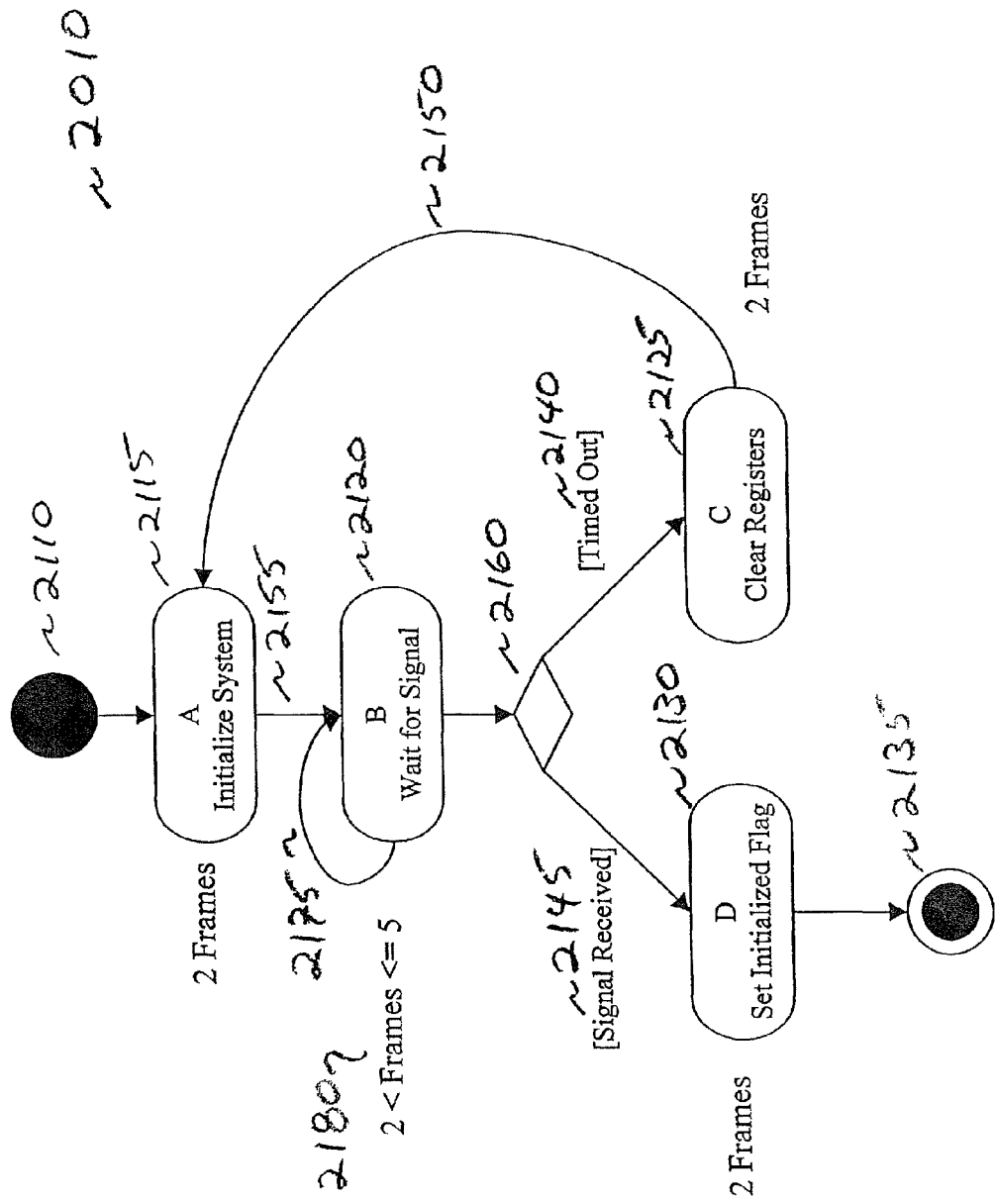
FIG. 2 is a schematic of the states of an exemplary state machine.

FIG. 2 is a state diagram of exemplary control state machine 2010 (FIG. 1). The exemplary control state machine and its corresponding state diagram are simplified examples of state machines and state diagrams in general and are presented for discussion purposes only. A state machine is a deterministic system that begins execution in a start state and continues execution until it reaches a stop or halt state. The control state machine has start state 2110 and stop state 2135. The control state machine passes through several states during its operation and may or may not perform an action while in each state. As an example, while in state A, The control state machine sends a control signal to transceiver 2000 (FIG. 1) to initialize the transceiver. The control state machine may transition from one state to another without an intervening event. For example, state B 2120 is reached by transition 2155 from state A without an intervening event. In state B, the control state machine loops by transition 2175 back to state B. This transition may be repeated for 2 to 5 frames or cycles as indicated by annotation 2180. In other words, the control state machine may transition from state B back to state B for at least 2 but not more than 5 frames. A transition from one state to another may require that a particular event occur or a signal be received. For example, the control state machine may receive a signal back from transceiver 2000 (FIG. 1) indicating that transceiver 2000 (FIG. 1) has been successfully initialized. If so, the control state machine may transition from state B to state D 2130. The transition condition is indicated by the "Signal Received" annotation 2145.

The operation of the control state machine may be described in the following manner. The control state machine starts from the start state and transitions to state A. The control state machine initializes transceiver 2000 (FIG. 1) and then makes the transition to state B where the control state machine waits for acknowledgment from transceiver 2000 (FIG. 1). The control state machine waits at state B until it either receives acknowledgment signal from transceiver 2000 or until the control state machine times out after 5 frames. If an acknowledgment signal is received, the control state machine makes a transition to state D and sets an initialization flag. The state machine then makes the transition to the halt state. Alternatively, if no acknowledgment signal is received after 5 frames, the control state machine makes the transition to state C where registers are cleared. The control state machine then makes the transition to state A where the process begins over again.

FIG. 3 is a depiction of the states control state machine 2010 (FIG. 2) goes through in two different operational scenarios. In one scenario, transceiver 2000 (FIG. 1) fails to initialize and control state machine 2010 loops indefinitely trying to initialize transceiver 2000. Sequence of states 2165, herein termed an expected state machine sequence, is the expected sequence of states that control state machine 2010 passes through during a failed initialization of transceiver 2000.

An expected state machine sequence may be generated by examining the design of the state machine. Referring again to FIG. 2, the sequence of states through which state machine 2010 passes when transceiver 2000 (FIG. 1) fails to initialize is: two frames are spent in state A 2115 (the partial sequence of expected state machine sequence 2165 (FIG. 3) is now AA); at least two frames with at most five frames spent in state B (the partial sequence of expected state machine sequence 2165 is now AABBBBBB); and 2 frames in state C 2125 (the partial sequence of expected state machine sequence 2165 is now AABBBBBBCC). The sequence "AABBBBBBCC" is repeated indefinitely if transceiver 2000 fails to initialize.

Referring again to FIG. 3, initialization failure expected state machine sequence 2165 is shown as the expected state machine sequence "AABBBBBBCC" repeated indefinitely. In a like manner, successful initialization expected state machine sequence 2170 is constructed from the states control state machine 2010 (FIG. 2) passes through during a successful initialization. The successful initialization expected state machine sequence consists of "AABBDD" with a suffix of "H" for halt state 2135 (FIG. 2) repeated indefinitely. Therefore, The sequences of states generated by control state machine 2010 during operation are indicative of the status and operation of transceiver 2000 (FIG. 1). If control state machine 2010 is observed to be repeating the sequence "AABBBBBCC" over and over again, it can be deduced that transceiver 2000 continues to fail to initialize. If the sequence "AABBDD" is observed, it can be deduced that transceiver 2000 was properly initialized. Therefore, observation of state machine sequences during operation of the state machine may serve as an indicator of the status of the system that the state machine is controlling. Deductions about a system controlled by a state machine may be made by matching state machine sequences taken from the state machine during operation and matching these state machine sequences to expected state machine sequences. The matching process may be automated and used as the basis of a diagnostic system.

Figure 4:
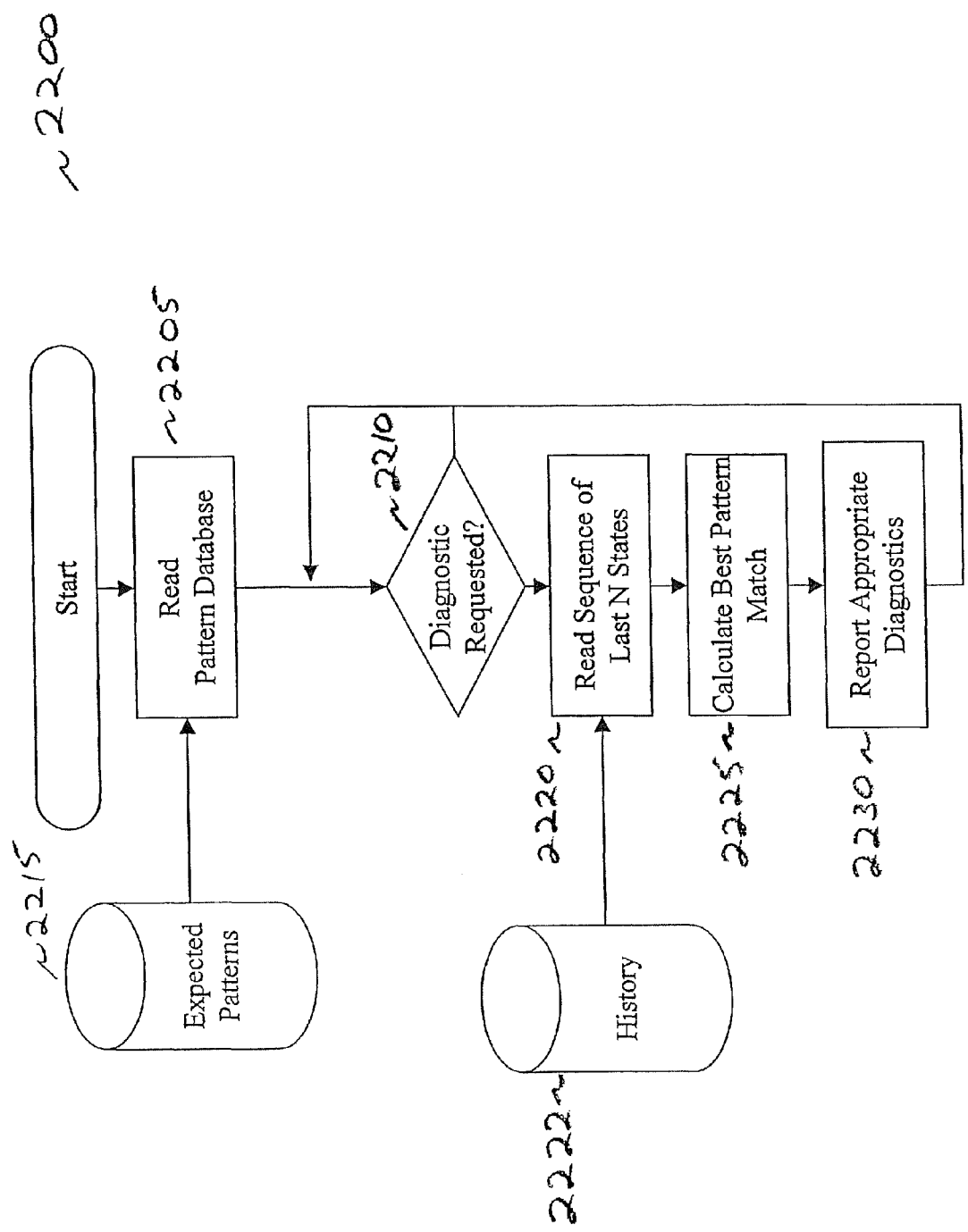
FIG. 4 is a flowchart of an exemplary diagnostic system based on the exemplary state machine's states.

FIG. 4 is a flowchart of an exemplary diagnostic system 2200 for transceiver 2000 (FIG. 1) based on observing state machine sequences generated by control state machine 2010 (FIG. 2). The exemplary diagnostic system may be implemented using any general purpose programming language. A plurality of expected state machine sequences 2215 are read from a persistent data storage device such as a magnetic storage disk or equivalent at step 2205. The exemplary diagnostic system 2200 loops indefinitely waiting at step 2210 for a request to perform a diagnostic function. The exemplary diagnostic system reads a sequence of the last states through which control state machine 2010 passed through from history database 2222 of stored states. The number of actual states read may be variable based on the number of expected states through which the state machine may pass. For example, if the maximum number of expected states for any normal operation is 1000 states, then only 1000 states may be read from the history database. The read sequence of states is termed the state machine sequence. The exemplary diagnostic system determines which of the plurality of expected state machine sequences from the expected state machine sequences database are the closest match to the state machine sequence at step 2220. The exemplary diagnostic system then reports the status of transceiver 2000 at step 2230. Diagnostic system 2200 returns to step 2210 to wait for another request to perform a diagnostic function.

Figure 5:
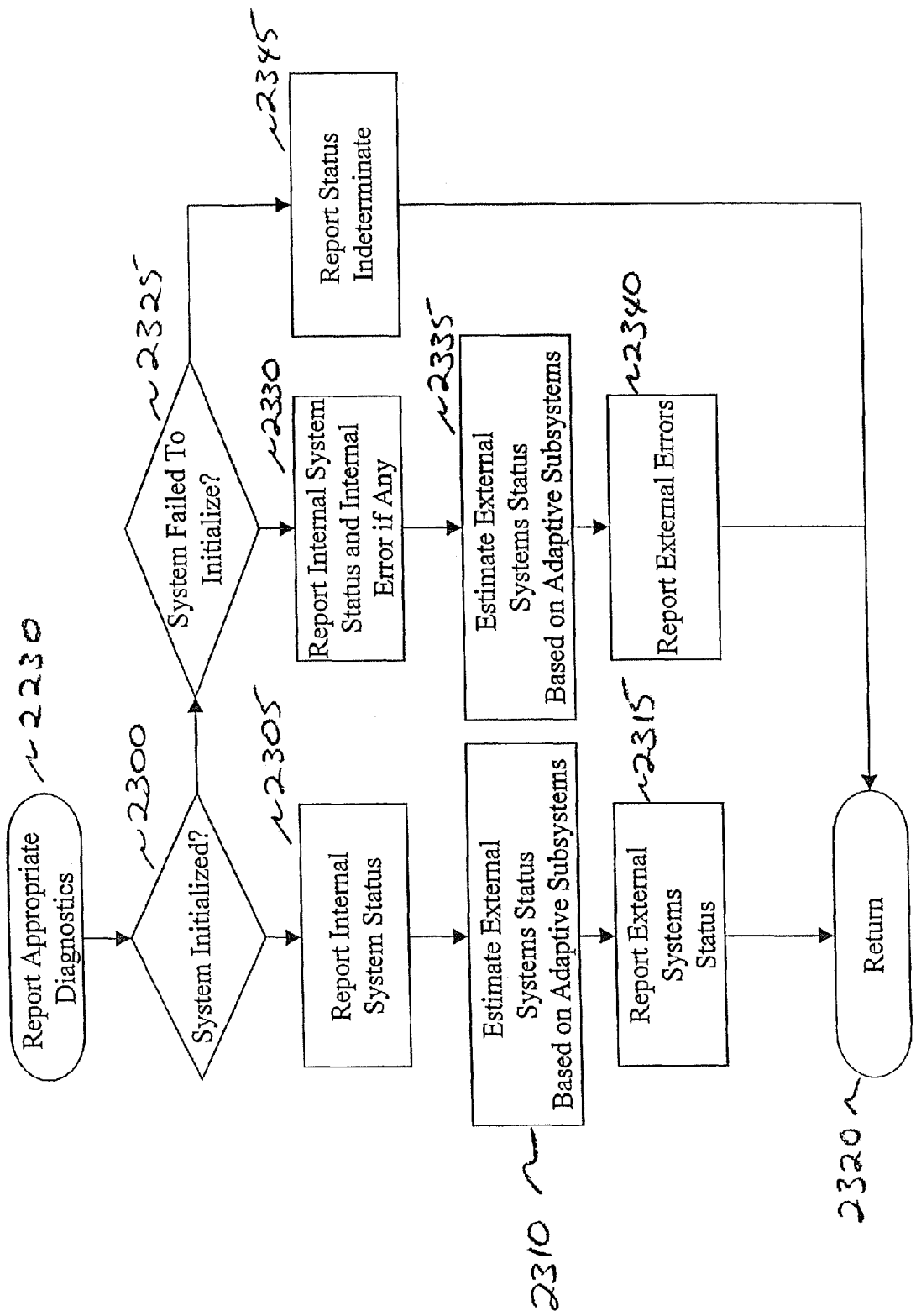
FIG. 5 is a flowchart of an exemplary diagnostic reporting system.

FIG. 5 is a flowchart of the process that may be used by exemplary diagnostic system 2200 (FIG. 4) to report the appropriate diagnostics as called for in step 2230 (FIG. 4). If the best matched expected state machine sequence to the state machine sequence as determined in step 2225 (FIG. 4) indicates that transceiver 2000 (FIG. 1) is initialized, exemplary diagnostic system 2200 passes through conditional step 2300 to step 2305 where exemplary diagnostic system 2200 reports the operational status of transceiver 2000 (FIG. 1). The exemplary diagnostic system 2200 then proceeds to step 2310 where the status of an external system may be estimated by examining the adaptive filters of transceiver 2000. Exemplary diagnostic system 2200 reports on the external environment at step 2315 and then ends the diagnostic process at step 2320. If the best matched expected state machine sequence to the state machine sequence as determined in step 2225 (FIG. 4) indicates that transceiver 2000 has failed to initialize, exemplary diagnostic system 2200 passes through conditional step 2325 to step 2330 where exemplary diagnostic system 2200 reports the error status of transceiver 2000. Exemplary diagnostic system 2200 proceeds to step 2335 where the status of an external system may be estimated as previously described. Exemplary diagnostic system 2200 reports any external errors found by estimating the external environment status at step 2340. If no expected state machine sequence matches the state machine sequence, then exemplary diagnostic system 2200 reports that the status of transceiver 2000 is indeterminate at step 2345.

Figure 6:
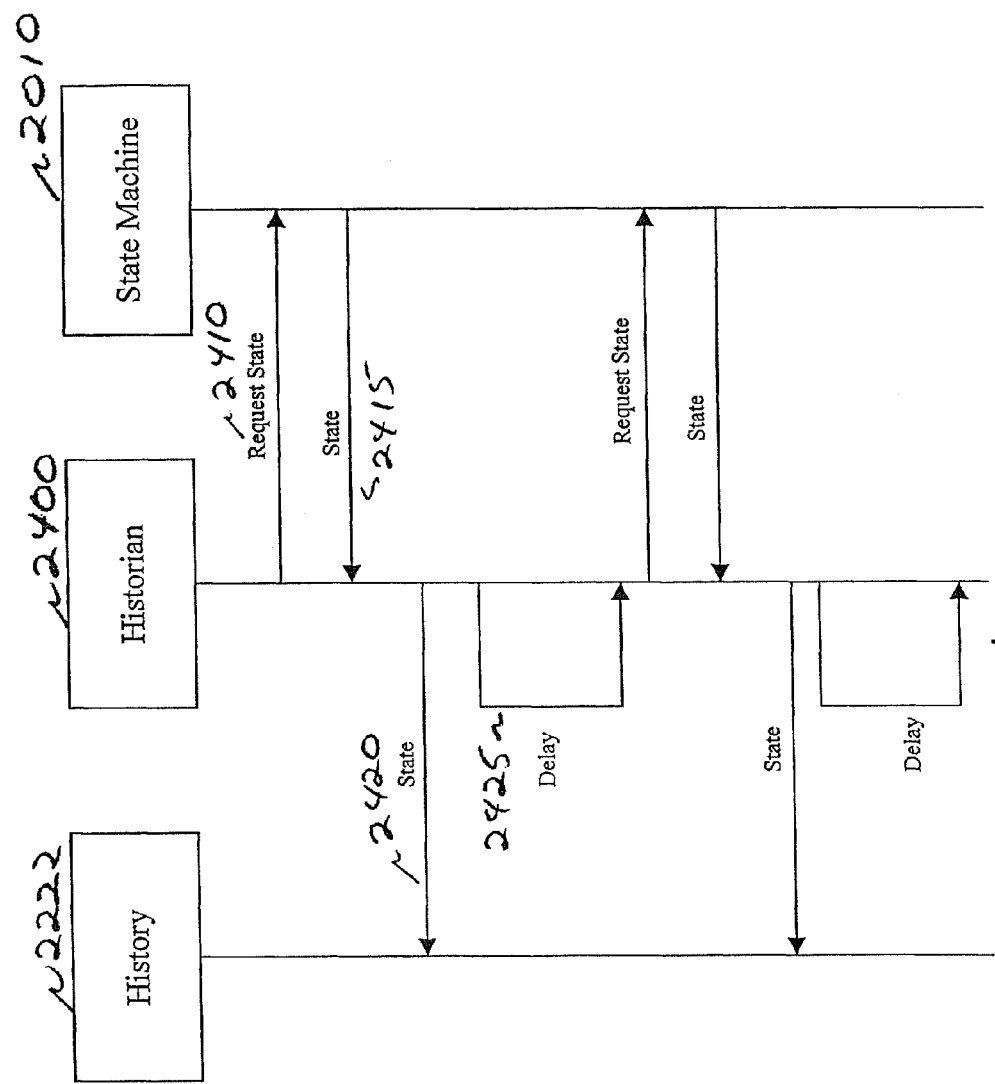
FIG. 6 is a sequence diagram of how a historian process may track the states of a state machine for further analysis.

A process for maintaining a history database of states is shown in FIG. 6. Historian process 2400 monitors control state machine 2010 and records the current state of the state machine in history database 2222. The historian process sends request 2410 to the control state machine for the current state of the control state machine. The control state machine responds to the request by sending state 2415 to the historian process. The historian process stores the received state 2415 as a stored state 2420 in the history database. The historian process then waits at delay 2425 before repeating the request and store process. The historian process continues to monitor the status of the control state machine for as long as the control state machine remains active. Recorded states in the history database are then representations of the current state of the control state machine taken over time and each state representation is separated from its neighbor by a known interval of time. In an alternative method, the historian process may be part of the same process as the control state machine but only executed as part of an interrupt request. In another alternative method, the control state machine may be self reporting and store states in the history database every time the control state machine makes a transition to a new state.

Figure 7:
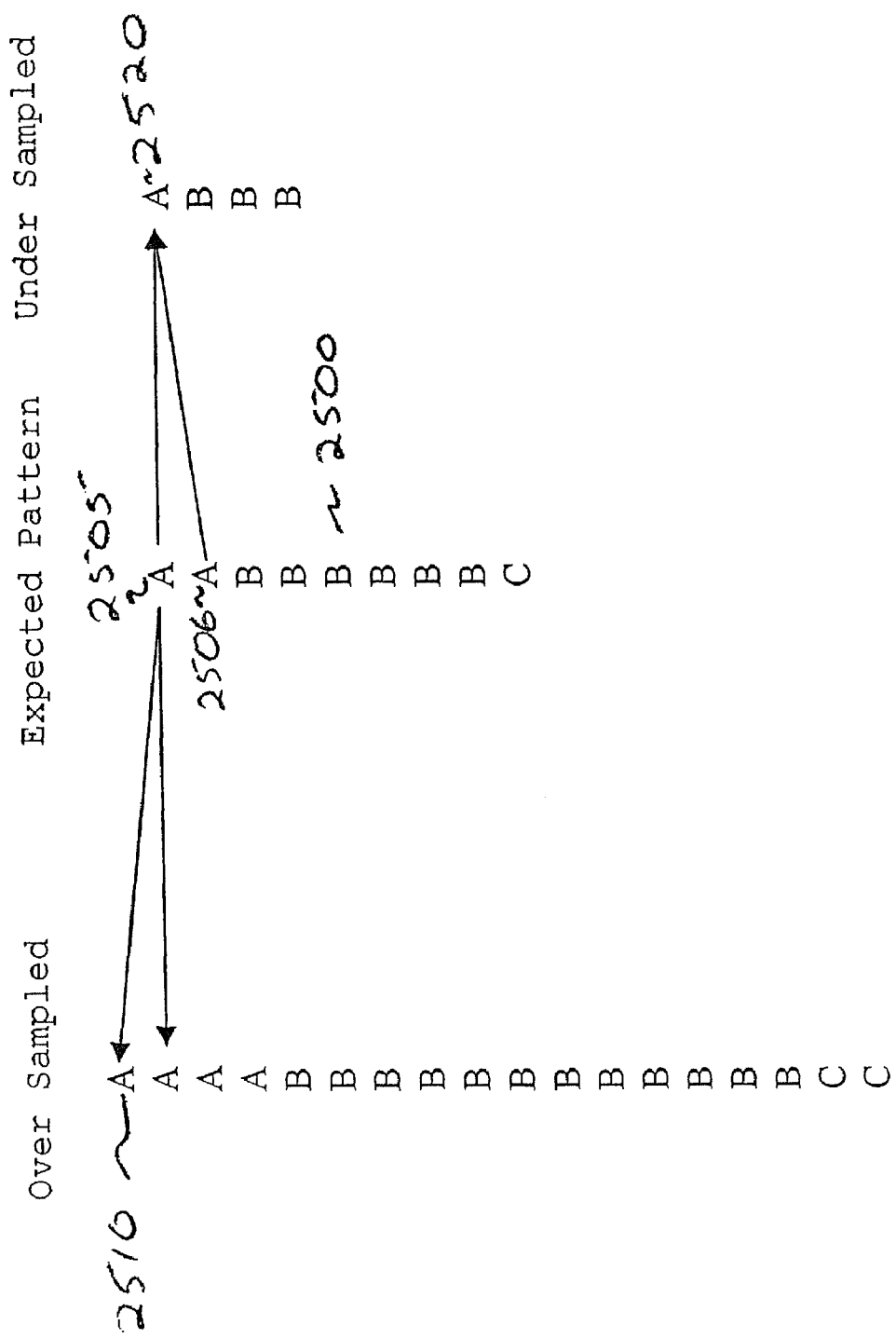
FIG. 7 is an example of how sampling by the historian process may lead to over and under sampling of the state machine states.

The effect of over and under sampling of a state machine is shown in FIG. 7. Periodically sampling the state that a state machine is in may lead to either over or under sampling of particular states. A state machine may remain in a state for an interval of time longer than the sampling interval. In this case, a single state may appear in a state history database a multiple number of times because the state machine was sampled a multiple number of times while remaining in that single state. This leads to over sampling of the state machine. An exemplary state machine sequence 2500 is shown FIG. 7. The exemplary state machine sequence corresponds to the scenario where control state machine 2010 (FIG. 2) does not receive an acknowledgment signal from transceiver 2000 (FIG. 1). The exemplary state machine sequence repeats the sequence "AABBBBBCC" indefinitely. Over sampling of the exemplary state machine sequence results in over sampled state machine sequence 2510 wherein expected state A 2505 is recorded twice in the over sampled state sequence. A state machine may also remain in a state for an interval of time shorter than the sampling interval. In this case, the state machine is under sampled. Under sampled state machine sequence 2520 is the result of under sampling of the exemplary state machine sequence. Expected state A 2505 and expected state A 2506 appear as a single state A 2502 in under sampled state sequence 2520. Over and under sampling may be compensated for by normalizing the expected state machine sequence by knowing the sampling interval used by historian process 2400 (FIG. 5) and comparing the sampling interval to the time interval a state machine is expected to remain in any given state. For example, exemplary expected state machine sequence 2500 may be transformed into the over sampled state sequence by knowing that a sampling interval is one half of the time a state machine is expected to remain in any given state. In this case, each expected state in the expected state sequence is replicated once creating a normalized over sampled expected state machine sequence that is twice as long as the exemplary expected state machine sequence. In a like manner, a normalized under sampled expected state machine sequence may be created from the exemplary expected state machine sequence by knowing that a sampling interval is twice the time a state machine is expected to remain in any given state.

In an alternative embodiment, expected state machine sequences may stored as a regular expression rather than as a complete sequence. For example, if a state machine is expected to remain in a state for hundreds of sampling periods then a regular expression for the expected hundred states could be stored as an expression such as "state A duration 100". Referring again to FIG. 8, system initialized expected state machine sequence 2610 may be written as:

state A duration 2
state B duration 3
state D duration 2
state H duration 2

Practitioners in the art of computer science will recognize that many encoding schemes may be appropriate for encoding expected state machine sequences.

Sampling of a state machine in an actual real-time system may also lead to "noisy" state sequence samples where states are missing from a state history database or spurious states are added as illustrated in FIG. 8. For example, a state machine may be operating in mode where it ignores a status request because it is in a critical portion of its operation or the data store for the history database may become corrupted because of the affects of an extreme environment. In this case, a state machine sequence created from a sequence sample may not match any single expected state machine sequence stored in an expected state machine sequences database. Approximate string matching may be used to find an expected state machine sequence that best matches a state machine sequence. Approximate string matching is an algorithm used to calculate the distance between two strings of characters by summing up the number of substitutions, deletions, or insertions needed to transform one string of characters into another. A substitution, deletion, or insertion is termed an edit. In the example of FIG. 8, state machine sequence 2600 is compared to system initialized expected state machine sequence 2610 and system not initialized expected state machine sequence 2615. The expected system initialized sequence may be transformed into the state machine sequence by making three edits as shown. The first state of the expected system initialized sequence and the state machine sequence is "A" so there is no edit needed. The second state of the state machine sequence is "B" and the second state of the system initialized expected state machine sequence is "A" so one edit is needed. No edits are needed in the 3$^{rd}$, 4$^{th}$, and 5$^{th}$ positions. An edit is needed in the 6$^{th}$ position to transform state "D" into state "B" for a total of two edits. An edit is not needed in the 7$^{th}$ position. A final edit is required in the 8$^{th}$ position to transform a "H" into a "D" for a total of three edits resulting in a distance of three between the state machine sequence and the expected system initialized sequence. In a like manner, the distance between the state machine sequence and system not initialized expected state machine sequence 2615 may be calculated as four. The best matched expected state machine sequence is therefore the system initialized expected state machine sequence.

Those skilled in the art of computer science will recognize that many different measures of edit distance may be used. As an example, the edit distance between any two states may be weighted based on the probability that one state is mistakenly recorded for another.

A dynamic programming algorithm may be used to calculate string distances as illustrated in FIG. 9. The exemplary dynamic programming algorithm is fully explained in the article "Approximate String Matching", by Patrick A. V. Hall and Geoff R. Dowling, appearing in Computing Surveys, Vol. 12, No. 4, December 1980 which is incorporated by reference as if fully stated herein. The following relations define the dynamic programming algorithm:

$$m[i,j]=d(s1[1 \ldots i], s2[1 \ldots j])$$

$$m[0,0]=0$$

$$m[i,0]=i, i=1 \ldots |s1|$$

$$m[0,j]=j, j=1 \ldots |s2|$$

$$m[i,j]=\min(m[i-1,j-1]+\text{if } s1[i]=s2[j] \text{ then 0 else 1 } \text{fi},\\ m[i-1, j]+1, m[i, j-1]+1),$$

$$i=1 \ldots |s1|, j=1 \ldots |s2|$$

Where:
s1=the first string to compare;
s2=the second string to compare;
s1[1 . . . i]=the substring of s1 from the first element to the ith element;
s2[1 . . . j]=the substring of s2 from the first element to the jth element;
|s1|=the length of the first string;
|s2|=the length of the second string;
s1[i]=the value of the element in string s1 at position i;
s2[j]=the value of the element in string s2 at position j;
m=a two dimensional matrix containing the distances between substrings of s1 and s2;
m[i,j]=the element of matrix m at row i and column j;
d( )=the distance between any two strings;
min( )=the minimum of alternative values.

Therefore, m[,] can be computed row by row because any row within a column, m[i,j], depends only on the previous row, m[i−1,j], within the same column. Starting values for any row or column are given by the boundary conditions where the distance between any compared string and the null string is the length of the compared string.

The example in FIG. 9 of a two dimensional matrix m[,] that is the result of using approximate string matching to compare state machine sequence 2600 and system initialized expected state machine sequence 2610. The first row of two dimensional matrix m[,] 2760 consists of row vector 2700 containing "0123456789" representing the length of each substring of the system initialized expected state machine sequence. For example, the substring "A" has a length of 1, the substring "AA" has a length of 2 and so on. In a like manner, first column vector 2710 represents the lengths of the substrings of the state machine sequence. These two vectors represent the boundary conditions of the dynamic algorithm because they represent the maximum possible distance for each string and its constituent substrings to any other string. Working a few steps through the algorithm, the first calculation column is calculated as follows:

m[1,1] equals the minimum of:
the value of m[1,0] if the element at system initialized expected state machine sequence[1] equals the value of the element at state machine sequence[1] or the value at m[0,0] plus 1 if the elements of system initialized expected state machine sequence[1] and state machine sequence[1] are different; or
m[0, 1]+1; or
m[1, 0]+1.

Examining system initialized expected state machine sequence[1] and state machine sequence[1] reveals that they are the same. The value of m[0,0] is 0 so the value of the first alternative in t of the The values to select from are 0, 1, or 1. The minimum value of these three values is 0 so the value of m[1,1] is 0.

m[2,1] equals the minimum of:
the value of m[1,0] if the element at system initialized expected state machine sequence[2] equals the value of the element at state machine sequence[1] or the value at m[1,0] plus 1 if the elements of system initialized expected state machine sequence[2] and state machine sequence[1] are different; or
m[1, 1]+1; or
m[2, 0]+1.
The values to select from are 1, 1, or 3. The minimum value of these three values is 1 so the value of m[2,1] is 1.
The rest of the values in the first calculation column are calculated in the same manner to create a calculation column with the values "013456789".

Each of the calculation columns may be calculated in a like manner until the entire calculation matrix is filled. The distance between any two substrings of equal length can be determined by examining the calculation diagonal 2720. For example, the distance between a substring of state machine sequence 2600 and system initialized expected state machine sequence 2610 both of length five is shown at m[5,5] or 1. The distance between the two full length strings is shown at m[9, 9] or 3 as previously determined in FIG. 8.

The afore described exemplary diagnostic system may be used to diagnose a variety of real-time systems. An exemplary real-time system can be a communication system implementing Gigabit Ethernet in copper-based Local Area Networks (LANs). Another popular communication system known as Fast Ethernet standard is IEEE 802.3u (commonly known as 100Base-TX). This standard, which is based on transmission over Category-5 Unshielded Twisted Pairs (UTP-5), has found widespread application in recent years. However, the need for higher data rates has prompted the development of an even higher speed transmission standard, the IEEE 802.3ab, also known as 1000Base-T. Communication systems based on this standard transmit at 1 Gb/s, also using Category-5 UTP. However, there are important differences in the way the Category-5 cable is used in 100Base-TX and in 1000Base-T. For example, 100Base-TX is essentially a half-duplex transmission scheme, where full-duplex operation is achieved by using one pair of the UTP-5 cable to transmit and another to receive. The UTP-5 cable has four twisted pairs, therefore two of them typically remain unused in 100Base-TX. On the other side, 1000Base-T provides full-duplex transmission on the four pairs of the UTP-5 cable. This means that each pair is used both to transmit and receive. The transmitted and received signals, which coexist in the cable, are separated at the receiver using echo cancellation techniques. To achieve an aggregate data rate of 1 Gb/s, the four pairs of the UTP-5 cable are used, each one supporting a data rate of 250 Mb/s. Since 1000Base-T uses the same cabling as 100Base-TX, the transition to the higher speed standard can be made without the need to rewire buildings or install new cable. However, since 100Base-TX does not use two of the four pairs of the UTP-5 cable, it is possible that in many installations the two unused pairs are not properly connected. This situation would have to be identified and fixed in order for the 1000Base-T system to work. This could add to the cost of installing 1000Base-T, even if no rewiring is needed in principle.

Figure 10:
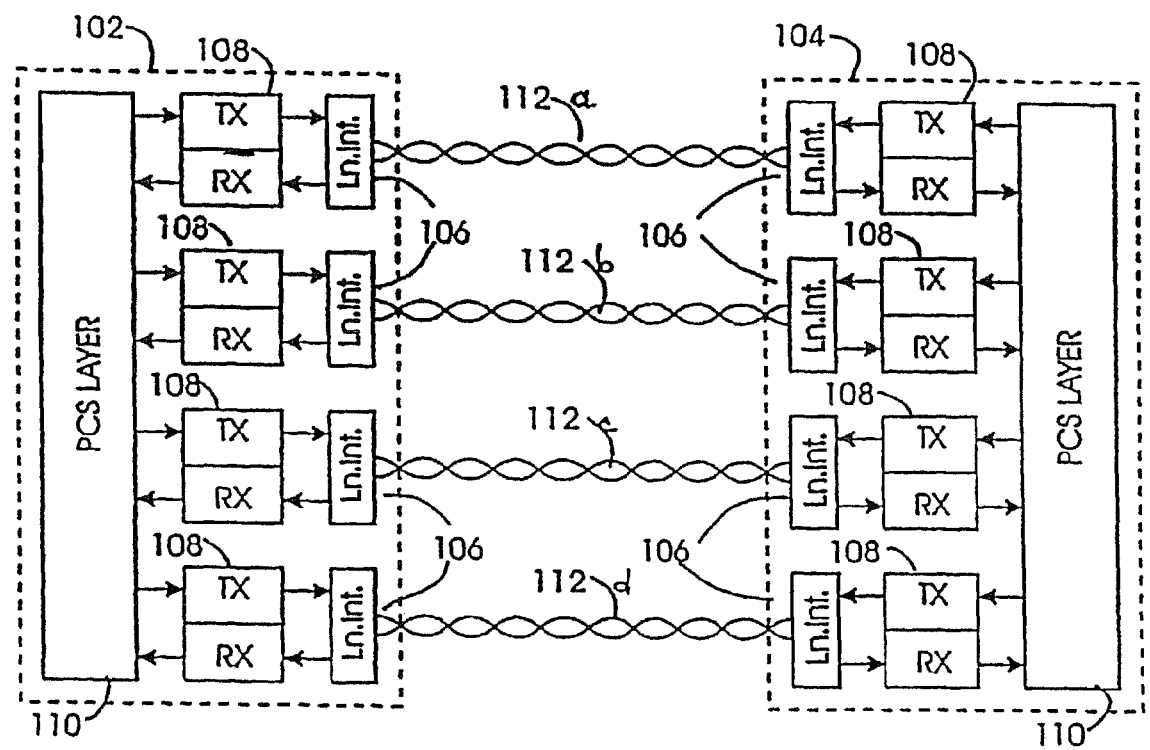
FIG. 10 is a schematic of an exemplary embodiment of four transceivers communicating over four twisted wire pairs.

FIG. 10 is a schematic of an exemplary embodiment of four transceivers combined in a 1000Base-T implementation communicating over four twisted wire pairs. The communication system is represented as a point-to-point system in order to simplify the explanation, and includes two main transceiver blocks 102 and 104, coupled together via four twisted-pair cables 112a, b, c and d. For the convenience of the following discussion, main transceiver 102 may also be termed a local transceiver and main transceiver 104 may be termed a remote transceiver. Each of the wire pairs 112a, b, c, d is coupled to each of the transceiver blocks 102, 104 through a respective one of four line interface circuits 106. Each of the wire pairs 112a, b, c, d facilitates communication of information between corresponding pairs of four pairs of transmitter/receiver circuits (constituent transceivers) 108. Each of the constituent transceivers 108 is coupled between a respective line interface circuit 106 and a Physical Coding Sublayer (PCS) block 110. At each of the transceiver blocks 102 and 104, the four constituent transceivers 108 are capable of operating simultaneously at 250 megabits of information data per second (Mb/s) each, i.e., 125 Mbaud at 2 information data bits per symbol, the 2 information data bits being encoded in one of the 5 levels of the PAM-5 (Pulse Amplitude Modulation) alphabet. The four constituent transceivers 108 are coupled to the corresponding remote constituent transceivers through respective line interface circuits to facilitate full-duplex bi-directional operation. Thus, 1 Gb/s communication throughput of each of the transceiver blocks 102 and 104 is achieved by using four 250 Mb/s constituent transceivers 108 for each of the transceiver blocks 102, 104 and four pairs of twisted copper cables to connect the two transceiver blocks 102, 104 together.

Figure 11:
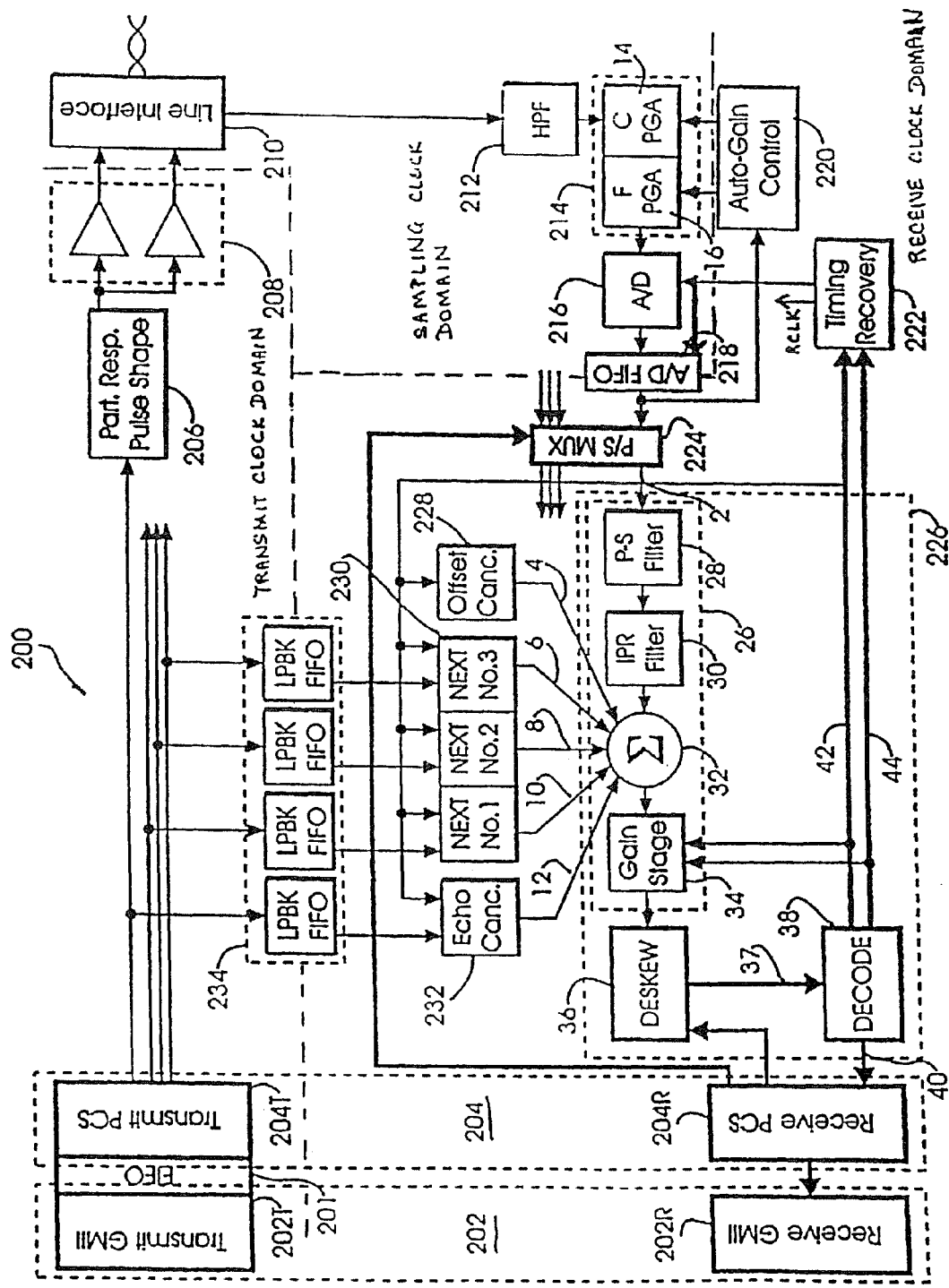
FIG. 11 is a schematic of an exemplary embodiment of a single transceiver from the exemplary four transceivers embodiment.

FIG. 11 is a simplified block diagram of the functional architecture and internal construction of an exemplary transceiver block, indicated generally at 200, such as transceiver 101 of FIG. 10. Since the illustrative transceiver application relates to Gigabit Ethernet transmission, the transceiver will be referred to as the "Gigabit transceiver". For ease of illustration and description, FIG. 11 shows only one of the four 250 Mb/s constituent transceivers which are operating simultaneously (termed herein 4-D operation). However, since the operation of the four constituent transceivers are necessarily interrelated, certain blocks and signal lines in the exemplary embodiment of FIG. 11 perform four-dimensional operations and carry four-dimensional (4-D) signals, respectively. By 4-D, it is meant that the data from the four constituent transceivers are used simultaneously. In order to clarify signal relationships in FIG. 11, thin lines correspond to 1-dimensional functions or signals (i.e., relating to only a single constituent transceiver), and thick lines correspond to 4-D functions or signals (relating to all four constituent transceivers).

Referring to FIG. 11, the Gigabit transceiver 200 includes a Gigabit Medium Independent Interface (GMII) block 202 subdivided into a receive GMII circuit 202R and a transmit GMII circuit 202T. The transceiver also includes a Physical Coding Sublayer (PCS) block 204, subdivided into a receive PCS circuit 204R and a transmit PCS circuit 204T, a pulse shaping filter 206, a digital-to analog (D/A) converter block 208, and a line interface block 210, all generally encompassing the transmitter portion of the transceiver.

The receiver portion of the transceiver generally includes a highpass filter 212, a Programmable Gain Amplifier (PGA) 214, an analog-to-digital (A/D) converter 216, an Automatic Gain Control (AGC) block 220, a timing recovery block 222, a pair-swap multiplexer block 224, a demodulator 226, an offset canceller 228, a Near-End Crosstalk (NEXT) canceller block 230 having three constituent NEXT cancellers and an echo canceller 232.

The Gigabit transceiver 200 also includes an A/D first-in-first-out buffer (FIFO) 218 to facilitate proper transfer of data from the analog clock region to the receive clock region, and a loopback FIFO block (LPBK) 234 to facilitate proper transfer of data from the transmit clock region to the receive clock region. The Gigabit transceiver 200 can optionally include an additional adaptive filter to cancel Far-End Crosstalk noise (FEXT canceller).

In operational terms, on the transmit path, the transmit section 202T of the GMII block receives data from a Media Access Control (MAC) module (not shown in FIG. 11) in byte-wide format at the rate of 125 MHz and passes them to the transmit section 204T of the PCS block via the FIFO 201. The FIFO 201 ensures proper data transfer from the MAC layer to the Physical Coding (PHY) layer, since the transmit clock of the PHY layer is not necessarily synchronized with the clock of the MAC layer. In one embodiment, this small FIFO 201 has from about three to about five memory cells to accommodate the elasticity requirement which is a function of frame size and frequency offset.

The PCS transmit section 204T performs certain scrambling operations and, in particular, is responsible for encoding digital data into the requisite codeword representations appropriate for transmission. In the illustrated embodiment of FIG. 11, the transmit PCS section 204T incorporates a coding engine and signal mapper that implements a trellis coding architecture, such as required by the IEEE 802.3ab specification for gigabit transmission.

In accordance with this encoding architecture, the PCS transmit section 204T generates four 1-D symbols, one for each of the four constituent transceivers. The 1-D symbol generated for the constituent transceiver depicted in FIG. 11 is filtered by the pulse shaping filter 206. This filtering assists in reducing the radiated emission of the output of the transceiver such that it falls within the parameters required by the Federal Communications Commission. The pulse shaping filter 206 is implemented so as to define a transfer function of $0.75+0.25z^{-1}$. This particular implementation is chosen so that the power spectrum of the output of the transceiver falls below the power spectrum of a 100Base-Tx signal. The 100Base-Tx is a widely used and accepted Fast Ethernet standard for 100 Mb/s operation on two pairs of Category-5 twisted pair cables. The output of the pulse shaping filter 206 is converted to an analog signal by the D/A converter 208 operating at 125 MHz. The analog signal passes through the line interface block 210, and is placed on the corresponding twisted pair cable.

On the receive path, the line interface block 210 receives an analog signal from the twisted pair cable. The received analog signal is preconditioned by the highpass filter 212 and the PGA 214 before being converted to a digital signal by the A/D converter 216 operating at a sampling rate of 125 MHz. The timing of the A/D converter 216 is controlled by the output of the timing recovery block 222. The resulting digital signal is properly transferred from the analog clock region to the receive clock region by the A/D FIFO 218. The output of the A/D FIFO 218 is also used by the AGC 220 to control the operation of the PGA 214.

The output of the A/D FIFO 218, along with the outputs from the A/D FIFOs of the other three constituent transceivers are inputted to the pair-swap multiplexer block 224. The pair-swap multiplexer block 224 uses the 4-D pair-swap control signal from the receive section 204R of PCS block to sort out the four input signals and send the correct signals to the respective FeedForward Equalizers (FFE) 26 of the demodulator 226. This pair-swapping control is needed for the following reason. The trellis coding methodology used for the Gigabit transceivers (101 and 102 of FIG. 10) is based on the fact that a signal on each twisted pair of wire corresponds to a respective 1-D constellation, and that the signals transmitted over four twisted pairs collectively form a 4-D constellation. Thus, for the decoding to work, each of the four twisted pairs must be uniquely identified with one of the four dimensions. Any undetected swapping of the four pairs would result in erroneous decoding. In an alternate embodiment of the Gigabit transceiver, the pair-swapping control is performed by the demodulator 226, instead of the combination of the PCS receive section 204R and the pair-swap multiplexer block 224.

The demodulator 226 includes a FFE 26 for each constituent transceiver, coupled to a deskew memory circuit 36 and a decoder circuit 38, implemented in the illustrated embodiment as a trellis decoder. The deskew memory circuit 36 and the trellis decoder 38 are common to all four constituent transceivers. The FFE 26 receives the received signal intended for it from the pair-swap multiplexer block 224. The FFE 26 is suitably implemented to include a precursor filter 28, a programmable inverse partial response (IPR) filter 30, a summing device 32, and an adaptive gain stage 34. The FFE 26 is a Least-Mean-Squares (LMS) type adaptive filter which is configured to perform channel equalization as will be described in greater detail below.

The precursor filter 28 generates a precursor to the input signal 2. This precursor is used for timing recovery. The transfer function of the precursor filter 28 might be represented as $-\gamma+z^{-1}$, with $\gamma$ equal to $\frac{1}{16}$ for short cables (less than 80 meters) and $\frac{1}{8}$ for long cables (more than 80 m). The determination of the length of a cable is based on the gain of the coarse PGA 14 of the programmable gain block 214.

The programmable IPR filter 30 compensates the Intersymbol Interference ISI introduced by the partial response pulse shaping in the transmitter section of a remote transceiver which transmitted the analog equivalent of the digital signal 2. The transfer function of the IPR filter 30 may be expressed as $1/(1+Kz^{-1})$. In the present example, K has an exemplary value of 0.484375 during startup, and is slowly ramped down to zero after convergence of the decision feedback equalizer included inside the trellis decoder 38. The value of K may also be any positive value less than 1.

The summing device 32 receives the output of the IPR filter 30 and subtracts therefrom adaptively derived cancellation signals received from the adaptive filter block, namely signals developed by the offset canceller 228, the NEXT cancellers 230, and the echo canceller 232. The offset canceller 228 is an adaptive filter which generates an estimate of signal offset introduced by component circuitry of the transceiver's analog front end, particularly offsets introduced by the PGA 214 and the A/D converter 216.

The three NEXT cancellers 230 may also be described as adaptive filters and are used, in the illustrated embodiment, for modeling the NEXT impairments in the received signal caused by interference generated by symbols sent by the three local transmitters of the other three constituent transceivers. These impairments are recognized as being caused by a crosstalk mechanism between neighboring pairs of cables, thus the term near-end crosstalk, or NEXT. Since each receiver has access to the data transmitted by the other three local transmitters, it is possible to approximately replicate the NEXT impairments through filtering. Referring to FIG. 11, the three NEXT cancellers 230 filter the signals sent by the PCS block to the other three local transmitters and produce three signals replicating the respective NEXT impairments. By subtracting these three signals from the output of the IPR filter 30, the NEXT impairments are approximately canceled.

Due to the bi-directional nature of the channel, each local transmitter causes an echo impairment on the received signal of the local receiver with which it is paired to form a constituent transceiver. In order to remove this impairment, an echo canceller 232 is provided, which may also be characterized as an adaptive filter, and is used, in the illustrated embodiment, for modeling the signal impairment due to echo. The echo canceller 232 filters the signal sent by the PCS block to the local transmitter associated with the receiver, and produces an approximate replica of the echo impairment. By subtracting this replica signal from the output of the IPR filter 30, the echo impairment is approximately canceled.

The adaptive gain stage 34 receives the processed signal from the summing circuit 32 and fine tunes the signal path gain using a zero-forcing LMS algorithm. Since this adaptive gain stage 34 trains on the basis of error signals generated by the adaptive filters 228, 230 and 232, it provides a more accurate signal gain than the one provided by the PGA 214 in the analog section.

The output of the adaptive gain stage 34, which is also the output of the FFE 26, is input to the deskew memory circuit 36. The deskew memory 36 is a four-dimensional function block, i.e., it also receives the outputs of the three FFEs of the other three constituent transceivers. There may be a relative skew in the outputs of the four FFEs, which are the four signal samples representing the four symbols to be decoded. This relative skew can be up to 50 nanoseconds, and is because of the variations in the way the copper wire pairs are twisted. In order to correctly decode the four symbols, the four signal samples must be properly aligned. The deskew memory aligns the four signal samples received from the four FFEs, then passes the deskewed four signal samples to a decoder circuit 38 for decoding.

In the context of the exemplary embodiment, the data received at the local transceiver was encoded before transmission, at the remote transceiver. In the present case, data might be encoded using an 8-state four-dimensional trellis code, and the decoder 38 might therefore be implemented as a trellis decoder. In the absence of ISI, a proper 8-state Viterbi decoder would provide optimal decoding of this code. However, in the case of Gigabit Ethernet, the Category-5 twisted pair cable introduces a significant amount of ISI. In addition, the partial response filter of the remote transmitter on the other end of the communication channel also contributes some ISI. Therefore, the trellis decoder 38 must decode both the trellis code and the ISI, at the high rate of 125 MHz. In the illustrated embodiment of the Gigabit transceiver, the trellis decoder 38 includes an 8-state Viterbi decoder, and uses a decision-feedback sequence estimation approach to deal with the ISI components.

The 4-D output of the trellis decoder 38 is provided to the PCS receive section 204R. The receive section 204R of the PCS block de-scrambles and decodes the symbol stream, then passes the decoded packets and idle stream to the receive section 202T of the GMII block which passes them to the MAC module. The 4-D outputs, which are the error and tentative decision, respectively, are provided to the timing recovery block 222, whose output controls the sampling time of the A/D converter 216. One of the four components of the error and one of the four components of the tentative decision correspond to the receiver shown in FIG. 11, and are provided to the adaptive gain stage 34 of the FFE 26 to adjust the gain of the equalizer signal path. The error component portion of the decoder output signal is also provided, as a control signal, to adaptation circuitry incorporated in each of the adaptive filters 230 and 232. Adaptation circuitry is used for the updating and training process of filter coefficients.

Figure 12:
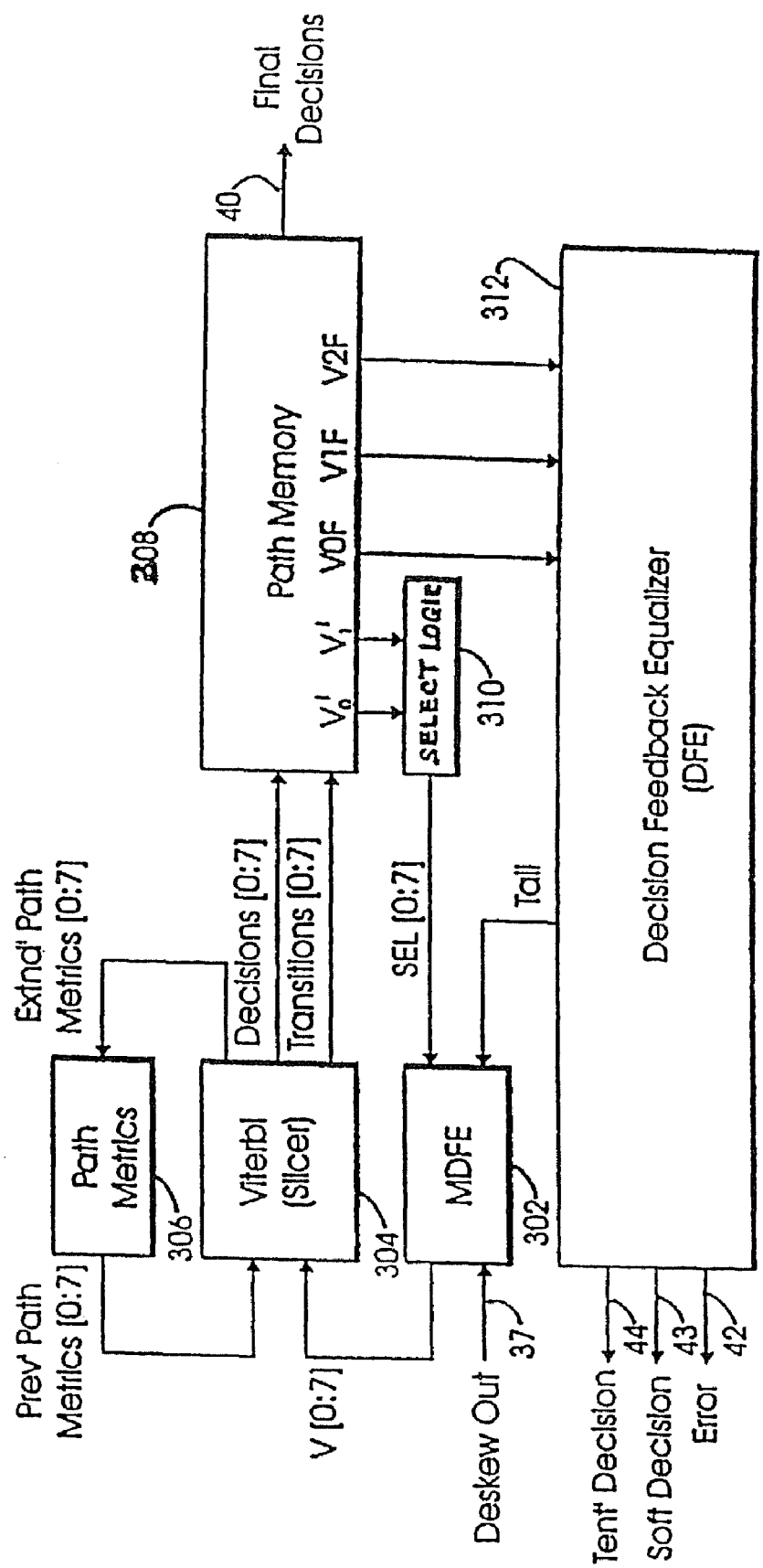
FIG. 12 is a schematic of an exemplary embodiment of a decoder from the exemplary embodiment of a single transceiver.

FIG. 12 is a block diagram of the trellis decoder 38 of FIG. 11. The trellis decoder 38 includes a multiple decision feedback equalizer (MDFE) 302, a Viterbi decoder 304, a path metrics module 306, a path memory module 308, a select logic 310, and a decision feedback equalizer 312.

The Viterbi decoder 304 performs 4D slicing of the Viterbi inputs provided by the MDFE 302 and computes the branch metrics. Based on the branch metrics and the previous path metrics received from the path metrics module 306, the Viterbi decoder 304 extends the paths and computes the extended path metrics. The Viterbi decoder 304 selects the best path incoming to each of the 8 states, updates the path memory stored in the path memory module 308 and the path metrics stored in the path metrics module 306.

The computation of the final decision and the tentative decisions are performed in the path memory module 308 based on the 4D symbols stored in the path memory for each state. At each iteration of the Viterbi algorithm, the best of the 8 states, i.e., the one associated with the path having the lowest path metric, is selected, and the 4D symbol from the associated path stored at the last level of the path memory is selected as the final decision 40 and provided to the receive section of the PCS 204R (FIG. 11). Symbols at lower depth levels are selected as tentative decisions, which are used to feed the delay line of the DFE 312.

The number of the outputs $V_i$ to be used as tentative decisions depends on the required accuracy and speed of decoding operation. A delayed version of $V_{0F}$ is provided as the 4D tentative decision 44 (FIG. 11) to the Feed-Forward Equalizers 26 of the 4 constituent transceivers and the timing recovery block 222 (FIG. 11).

Based on the symbols $V_0$, $V_{1F}$, and $V_{2F}$, the DFE 312 produces the intersymbol interference (ISI) replica associated with all previous symbols except the two most recent (since it was derived without using the first two taps of the DFE 312. The ISI replica is fed to the MDFE 302 (this ISI replica is denoted as the "tail component"). The MDFE 302 computes the ISI replica associated with all previous symbols including the two most recent symbols, subtracts it from the output 37 of the deskew memory block 36 (FIG. 11) and provides the resulting Viterbi inputs to the Viterbi decoder 304.

The DFE 312 also computes an ISI replica associated with the two most recent symbols, based on tentative decisions $V_{0F}$, $V_{1F}$, and $V_{2F}$. This ISI replica is subtracted from a delayed version of the output 37 of the de-skew memory block 36 to provide the soft decision 43. The tentative decision $V_{0F}$ is subtracted from the soft decision 43 to provide the error 42. There are 3 different versions of the error 42, which are 42enc, 42ph and 42dfe. The error 42enc is provided to the echo cancellers and NEXT cancellers of the constituent transceivers. The error 42ph is provided to the FFEs 26 (FIG. 11) of the 4 constituent transceivers and the timing recovery block 222. The error 42dfe is used for the adaptation of the coefficients of the DFE 312. The tentative decision 44 shown in FIG. 12 is a delayed version of $V_{0F}$. The soft decision 43 is only used for display purposes.

For the exemplary Gigabit transceiver system 200 described above and shown in FIG. 11, there are design considerations regarding the allocation of boundaries of the clock domains. These design considerations are dependent on the clocking relationship between transmitters and receivers in a Gigabit transceiver. Therefore, this clocking relationship will be discussed first.

During a bidirectional communication between two Gigabit transceivers 101, 102 (FIG. 10), through a process called "auto-negotiation", one of the Gigabit transceivers assumes the role of the master while the other assumes the role of the slave. When a Gigabit transceiver assumes one of the two roles with respect to the remote Gigabit transceiver, each of its constituent transceivers assumes the same role with respect to the corresponding one of the remote constituent transceivers. Each constituent transceiver 108 is constructed such that it can be dynamically configured to act as either the master or the slave with respect to a remote constituent transceiver 108 during a bidirectional communication. The clocking relationship between the transmitter and receiver inside the constituent transceiver 108 depends on the role of the constituent transceiver (i.e., master or slave) and is different for each of the two cases.

Figure 13:
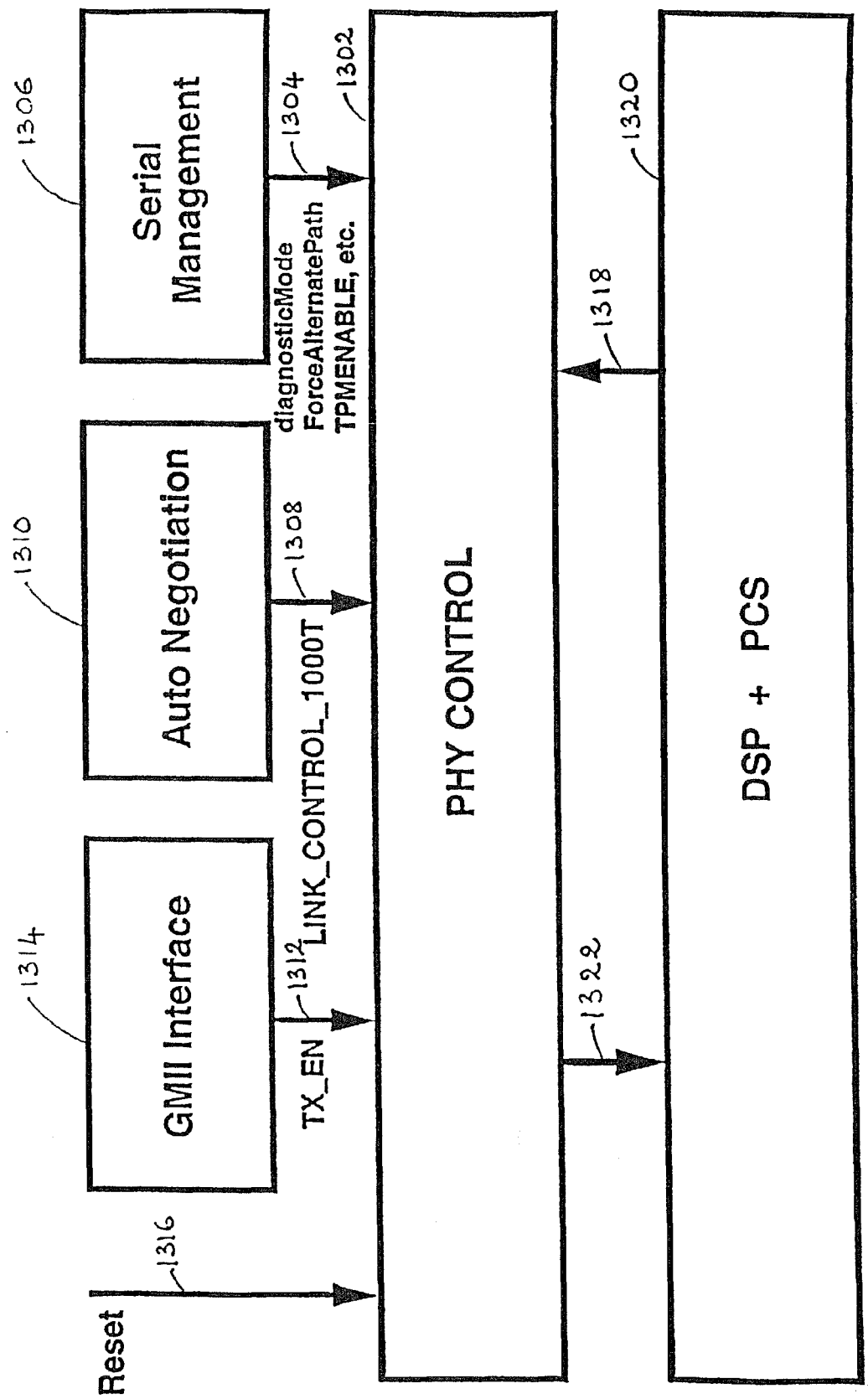
FIG. 13 is an exemplary systems architecture for an exemplary embodiment of a state machine controlling the exemplary transceivers embodiment.

FIG. 13 is a high-level block diagram of the Gigabit transceiver illustrating the interactions between Physical Control (PHY Control) module 1302 and other modules of the Gigabit transceiver. The PHY Control module implements state machines used to control the Gigabit transceiver. The PHY Control module receives user-defined signals 1304 from the Serial Management module 1306, the link control signal 1308 from the Auto Negotiation module 1310, the transmit enable signal from the GMII module 1314, and status signals 1318 from the Digital Signal Processing (DSP) module and the Physical Coding Sublayer (PCS) module 1320. The PHY Control module can also receive a reset signal 1316 directly from a user to reset all state machines of the PHY Control module and to reset the DSP and PCS modules.

Based on the signals it receives and its internal states, the PHY Control module outputs control signals 1322 to the DSP and PCS modules to control operations of these two modules. The DSP module includes all the blocks that are in the Receive Clock domain as shown in FIG. 11, except the Receive PCS 204R and the Receive GMII 202R.

Inputs to the Serial Management module 1306 are provided by a user or by software, and, for simplicity of design, can be stored and read out serially as the user-defined signals 1304. Examples of user-defined signals are DiagnosticMode (to operate the Gigabit transceiver in diagnostic mode), ForceAlternatePath (to force a state machine of the PHY Control module to take an alternate path) and TPMENABLE (to enable Tap Power Management).

The Link_Control_1000T signal 1308 from the Auto Negotiation module indicates whether a link is to be established with a remote transceiver. The transmit enable signal 1312 from the GMII module indicates whether transmission of packets can start.

The PHY Control module can reset the DSP and PCS modules. By reset, it is meant initializing everything, including clearing all registers.

The PHY Control module controls the convergence of the Echo cancellers 232 and NEXT cancellers 230 (FIG. 11), the DFE 312 (FIG. 12) and the Timing Recovery block 222 (FIG. 11). The PHY Control module also controls the ramping down of the parameter k of the Inverse Partial Response (IPR) filter 30 (FIG. 11) during the startup of the Gigabit transceiver.

The PHY Control module controls the alignment function of the Receive PCS 204R. As stated previously, the PCS aligns the four signals received over the four pairs and deskews them before they are provided to the decoder 38 (FIG. 11).

The PHY Control module controls the operation of the Tap Power Management which is a sub-module of the PHY Control module. The Tap Power Management enables part of the Echo cancellers 232 and NEXT cancellers 230 (FIG. 11) during the startup. After, startup, the Tap Power Management activates or deactivates certain taps in accordance to a criterion to optimize the tradeoff between power consumption and system performance. The tap activation or deactivation is staggered across the four pairs to avoid large power surges. The Tap Power Management will be described in detail later.

The PHY Control module optimizes the phase of the receive clock RCLK relative to the phases of the four sampling clocks ACLK0-ACLK3 to minimize the effect of switching noise on the four A/D converters 216 (FIG. 11).

The PHY Control module performs small adjustments to the phases of the four sampling clocks ACLK0-ACLK3 to further optimize the system performance.

The PHY Control module re-centers the A/D FIFO 218 and the FIFOs 234 (FIG. 11) after timing acquisition and phase adjustments of the receive clock RCLK and sampling clocks ACLK0-ACLK3.

The PHY Control module implements various test modes such as Diagnostic Mode, Alternate Path and Loopback. In Loopback mode, referring to FIG. 11, signals output from the Transmit PCS 204T pass through the FIFOs 234 then loop back directly to the Receive PCS 204R without passing through any other block.

The PHY Control module monitors performance of the receiver during normal operation. If the receiver performance drops below a pre-specified level, the PHY Control module retrains the receiver.

Figure 14:
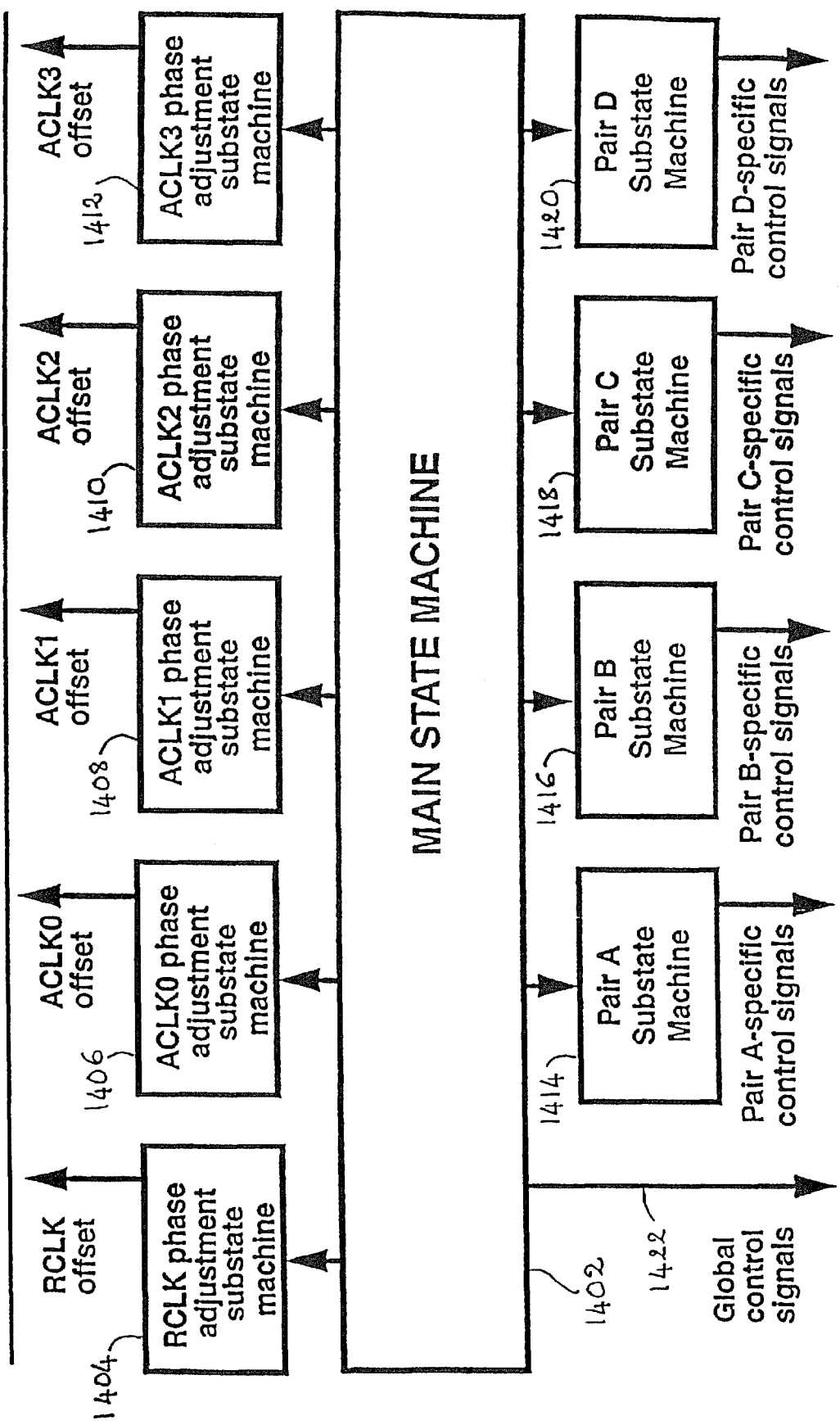
FIG. 14 is an exemplary embodiment of a state machine capable of controlling the exemplary transceivers embodiment.

FIG. 14 illustrates the hierarchical structure of PHY Control module 1302 (FIG. 13). PHY Control module 1302 (FIG. 13) includes a main state machine 1402 that controls operations of a set of substrate machines.

The RCLK phase adjustment substrate machine outputs the control signal RCLK offset to the Timing Recovery block 222 (FIG. 11) to adjust the phase of the receive clock RCLK. Each of the ACLKx (x=0, . . . , 3) phase adjustment substrate machines 1406, 1408, 1410, 1412 outputs a respective ACLKx offset to adjust the phase of the corresponding sampling clock ACLKx (x=0, . . . , 3).

The main state machine 1402 controls four pair-specific substrate machines 1414, 1416, 1418, 1420, each of which is specific to one of the four constituent transceivers (also called pairs) A, B, C, D. Each of these four substrate machines outputs control signals that are specific to the corresponding constituent transceiver. The main state machine 1402 also outputs global control signals 1422 to all four pairs.

The four constituent receivers converge independently. Each one is controlled by a separate pair-specific substrate machine (1414, 1416, 1418, 1420). This allows retries of the convergence of one constituent receiver in case it fails the first try, without having to reset the constituent receivers that succeed. Within each pair-specific substrate machine, different substrate machines are used for convergence of the Master Echo/NEXT cancellers, convergence of the Master DFE, convergence of the Slave Echo/NEXT cancellers, convergence of the Slave DFE.

Except for the Tap Power Management that runs at the sampling clock rate of $f_s$=125 MHz, most parts of PHY Control module 1302 (FIG. 13) can run at much lower clock rates to reduce power dissipation in PHY Control module 1302 (FIG. 13). For example, most of PHY Control module 1302 (FIG. 13) can run at the clock rate of $f_s/1024$, i.e., 122 kHz. The clock rate for RCLK offset is $f_s/16$. The clock rate for the control signal for AGC 220 (FIG. 11) is $f_s/128$. The clock rate for the control signal which updates the Offset canceller 228 is $f_s/4$.

PHY Control module 1302 (FIG. 13) includes a mean square error (MSE) computation block for each constituent transceiver to compute the MSE of the respective constituent transceiver. The MSE is compared with different thresholds to provide control signals EnergyDetect, MSEOK1, MSEOK2, MSEOK3 which are used by the main state machine and the substrate machines of PHY Control module 1302 (FIG. 13).

The PHY control module maintains a set of internal registers that may be read when the PHY control module is placed in diagnostics mode. The values in the internal registers reflect the states through which the main state and substrate machines pass during their operation. These internal registers may be read by an external software system as exemplified by historian process 2400 (FIG. 6) in order to record the main state machine and substrate machine state machines sequences. In an alternative embodiment, the internal registers may be supplemented by buffers, one buffer for the main state machine and one buffer for each of the substrate machines. The current state of each state machines is stored in a corresponding buffer and the entire corresponding buffer may be read by an external software process in one operation. In this way, the PHY control module acts as historian for all of its constituent state machines.

Figure 15:
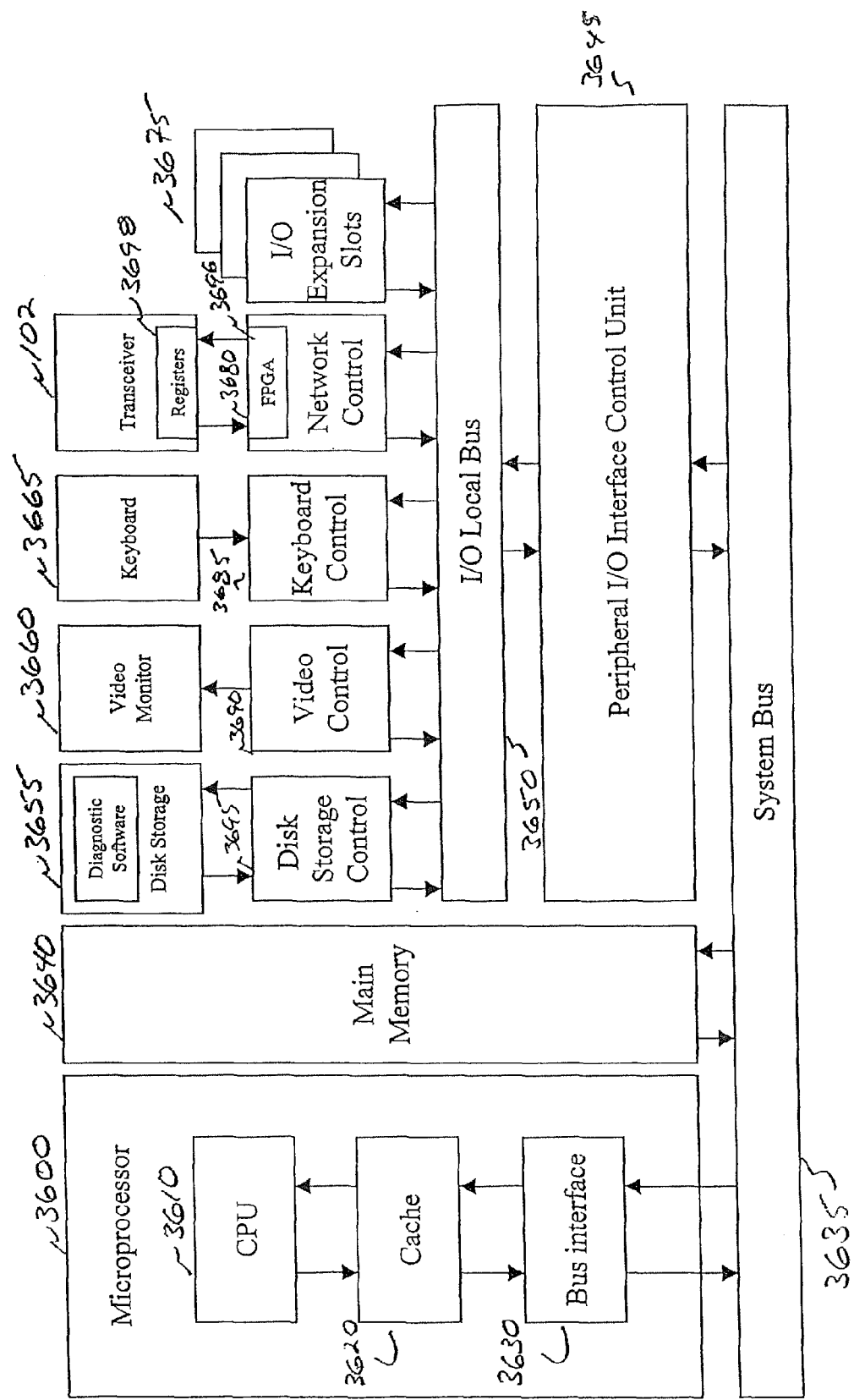
FIG. 15 is an exemplary embodiment of a computer system incorporating the exemplary transceivers embodiment.

FIG. 15 is an exemplary embodiment of a computer system incorporating the exemplary transceivers embodiment of FIGS. 10 through 14. Microprocessor 3600, comprised of a Central Processing Unit (CPU) 3610, memory cache 3620, and bus interface 3630, is coupled via system bus 3635 to main memory 3640 and I/O control unit 3645. The I/O interface control unit is coupled via I/O local bus 3650 to disk storage controller 3695, video controller 3690, keyboard controller 3685, and network controller 3680. The disk storage controller is coupled to disk storage device 3625. The video controller is coupled to video monitor 3660. The keyboard controller is coupled to keyboard 3665. The network controller is coupled to exemplary transceivers embodiment 102.

Field Programmable. Gate Array (FPGA) 3696 in the network controller contains the firmware encoding the operations of PHY control module 1302 (FIG. 13) and its constituent state machines. The PHY control module has access to registers 3698 in the exemplary transceiver. The registers contain values for the filter coefficients for DFE 312 (FIG. 12), filter coefficients for each of three NEXT filters 230 (FIG. 11), filter coefficients for echo canceller 232 (FIG. 11), gain of FFE 26 (FIG. 11), and fine and coarse gains of AGC 220 (FIG. 11). The PHY control module makes values stored in the registers available to other software components within the exemplary computer system.

Diagnostic software 3697 comprising computer instructions encoding software components of an exemplary transceiver diagnostic system is stored on the disk storage device. In operation, The diagnostic software is read from the disk storage device into the main memory by the microprocessor. The microprocessor then begins executing the computer instructions contained within the diagnostic software, thus serving as a host for the exemplary transceiver diagnostic system. The exemplary transceiver diagnostic system may then access the registers in the exemplary transceiver through the PHY control module as implemented in the FPGA. The exemplary transceiver diagnostic system receives user commands via the keyboard and displays diagnostic results to a user using the video monitor.

Figure 16:
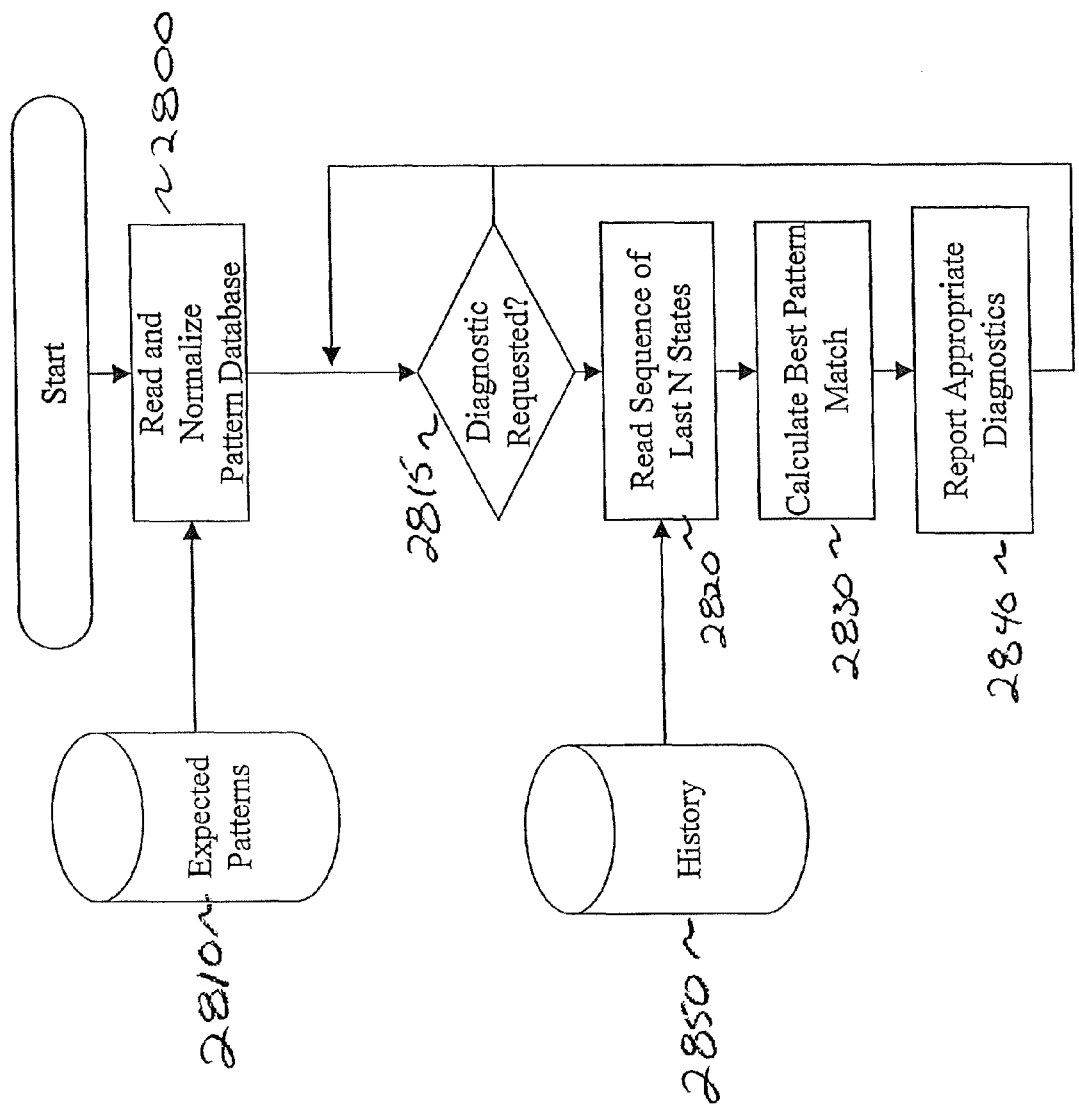
FIG. 16 is flowchart of an exemplary embodiment of a transceiver diagnostic system.

FIG. 16 is a top level flowchart of an exemplary embodiment of a transceiver diagnostic system for the afore-described exemplary Gigabit transceiver. The exemplary transceiver diagnostic system embodiment differs from the exemplary diagnostic system of FIG. 4 in that the exemplary transceiver diagnostic system includes an expected state machine sequence normalization step not shown in the exemplary diagnostic system of FIG. 4. Normalization of expected state machine sequences may not be needed depending on how state machine sequences are captured. The transceiver diagnostic system reads expected state machine sequences from datastore 2810 and the expected state machine sequences are normalized at step 2800. The normalization process was previously described in relation to FIG. 7 and the exact normalization factors may be system dependent. The transceiver diagnostic system then rests in an idle loop waiting for a diagnostic request 2815. If a diagnostic is requested, the transceiver diagnostic system reads the last sequence of states of monitored state machine at step 2820. The exact number of states read is dependent upon both the storage capacity system and the number of states the state machine is expected to pass through during normal operation. The transceiver diagnostic system finds the expected state machine sequence that best matches the last sequence of states through which the state machine passed at step 2830. Sequence matching may be performed as previously described in relation to FIGS. 8 and 9. The transceiver diagnostic system then reports the appropriate diagnostic message at step 2840 and returns to an idle waiting state waiting for a diagnostic request at step 2815.

Figure 17:
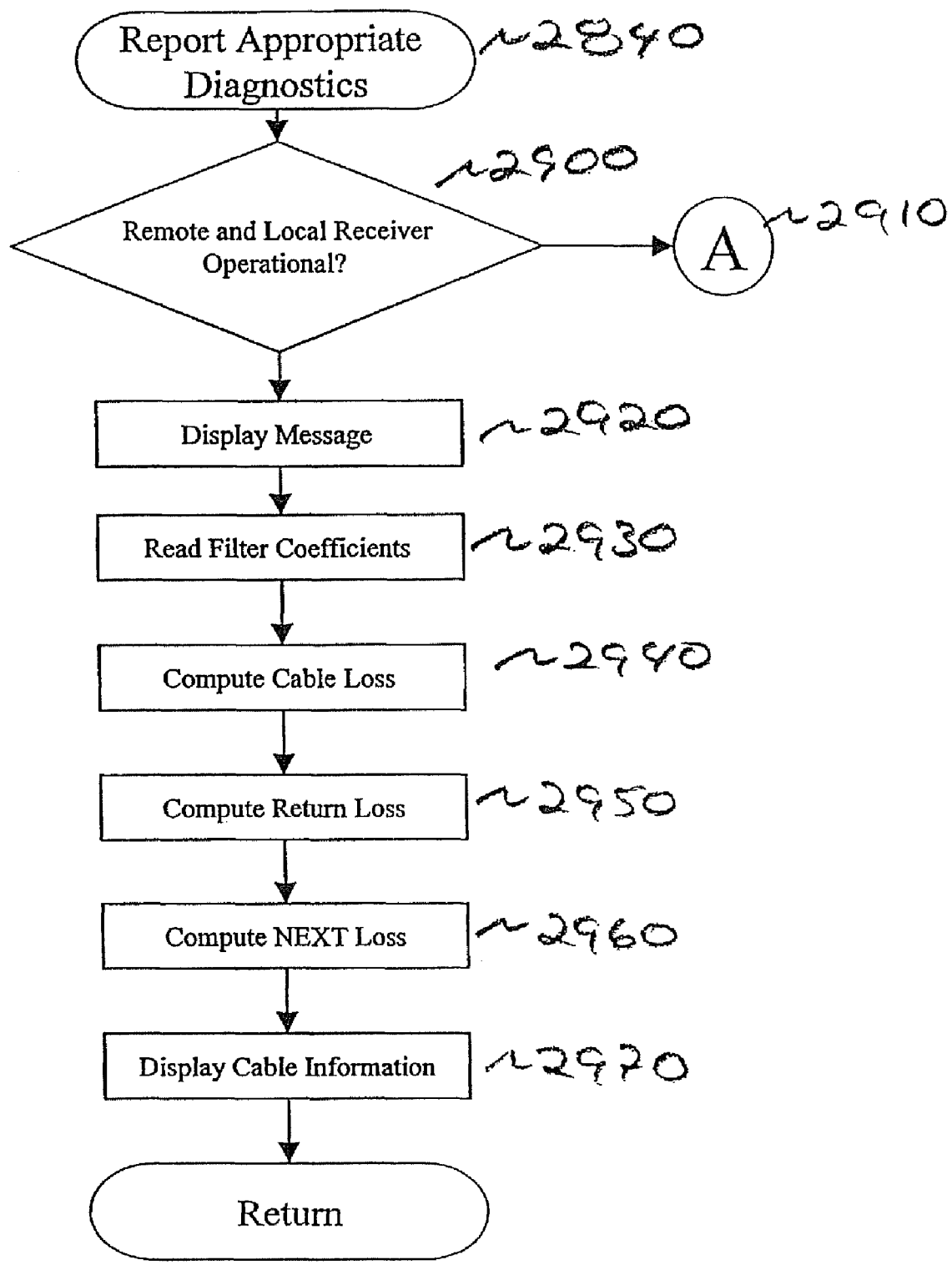
FIG. 17 is a flowchart of an exemplary embodiment of a diagnostic process when the local and remote exemplary transceivers embodiments are operating normally.

FIGS. 17 through 23 are flowcharts for an exemplary diagnostic report function suitable for use in report appropriate diagnostics step 2840 (FIG. 16). Turning now to FIG. 17, the diagnostic report function determines at step 2900 if the best matched expected state machine sequence is the expected state, machine sequence resulting from exemplary transceivers 102 and 104 (FIG. 10) operating normally. If the best matched sequence is the expected state machine sequence resulting from exemplary transceivers 102 and 104 operating normally, then the diagnostic report function displays a message at step 2920 indicating that operation of the exemplary transceivers 102 and 104 is normal. The diagnostic report function reads filter coefficients of the self adapting filters of exemplary transceiver 200 (FIG. 11) at step 2930.

The diagnostic report function calculates the cable loss experienced by the signal transmitted between corresponding pairs of constituent transceivers 108 (FIG. 10) communicating over corresponding twisted pair of wires 112a-112d (FIG. 10) at step 2940. The filter coefficients of DFE 312 (FIG. 12) represent the convolution of a transmitted pulse sent from the constituent transceiver of master transceiver 102 (FIG. 10) to the constituent transceiver of slave transceiver 104 (FIG. 10) with the impulse response of the twisted pair linking the paired constituent transceivers. The transmitted pulse convoluted by the impulse response as represented by the filter coefficients of the DFE is scaled by the gain of coarse and fine AGC 14 and (FIG. 11), as well as the gain of FFE 26 (FIG. 11). The inverse Fourier transform of the filter coefficients of the DFE is thus the frequency response of the communications channel linking the two constituent transceivers multiplied by the frequency spectrum of the transmitted pulse which is also scaled by the gains of the AGC and the FFE. The Fourier transform of the transmitted pulse may be calculated before-hand and stored for use by the diagnostic report function because the transmitted pulse characteristics are known before-hand as an artifact of the transceiver design process. For example, a desired transmitted pulse may be specified during the initial transceiver design and expected characteristics of an actual transmitted pulse may be calculated once the transceiver design is finalized. The diagnostic report function obtains a transfer function for the communications channel by dividing the Fourier transform of the filter coefficients by the Fourier transform of the transmitted pulse and by the gains of the FFE and AGC. The transfer function may be displayed and compared to the limits set by the IEEE 802.3ab standard. The difference between the measured response and the IEEE limit at the point of minimum difference is the margin reported by the diagnostic report function. Finally, an estimate of cable length is computed by dividing the observed loss at 31.5 MHz, by the expected loss per unit length of the UTP-5 cable at the same frequency. The estimated cable length may also be made available for display.

The diagnostic report function computes the return loss at step 2950. The return loss is calculated in the same fashion as the cable loss in step 2940. However, the coefficients of echo canceller 232 (FIG. 11) are used. The return loss is reported as a function of frequency and margins versus IEEE limits. The cable length may also be estimated using the reflection from the far-end of the cable, which typically exists as a result of mismatches between the termination impedance and the characteristic impedance of the cable. The delay of this reflection is divided by twice the delay per unit length of the UTP-5 cable, to obtain an independent estimate of the cable length. When the cable is broken at some intermediate point, this function returns as estimate of cable length the distance between the transceiver and the point where the cable is cut.

The diagnostic report function computes the NEXT loss at step 2960. This NEXT loss is calculated in the same way as the return loss but the coefficients of the NEXT canceller block 230 (FIG. 11) are used.

The diagnostic report function displays the results of the cable calculations at step 2970.

Figure 18:
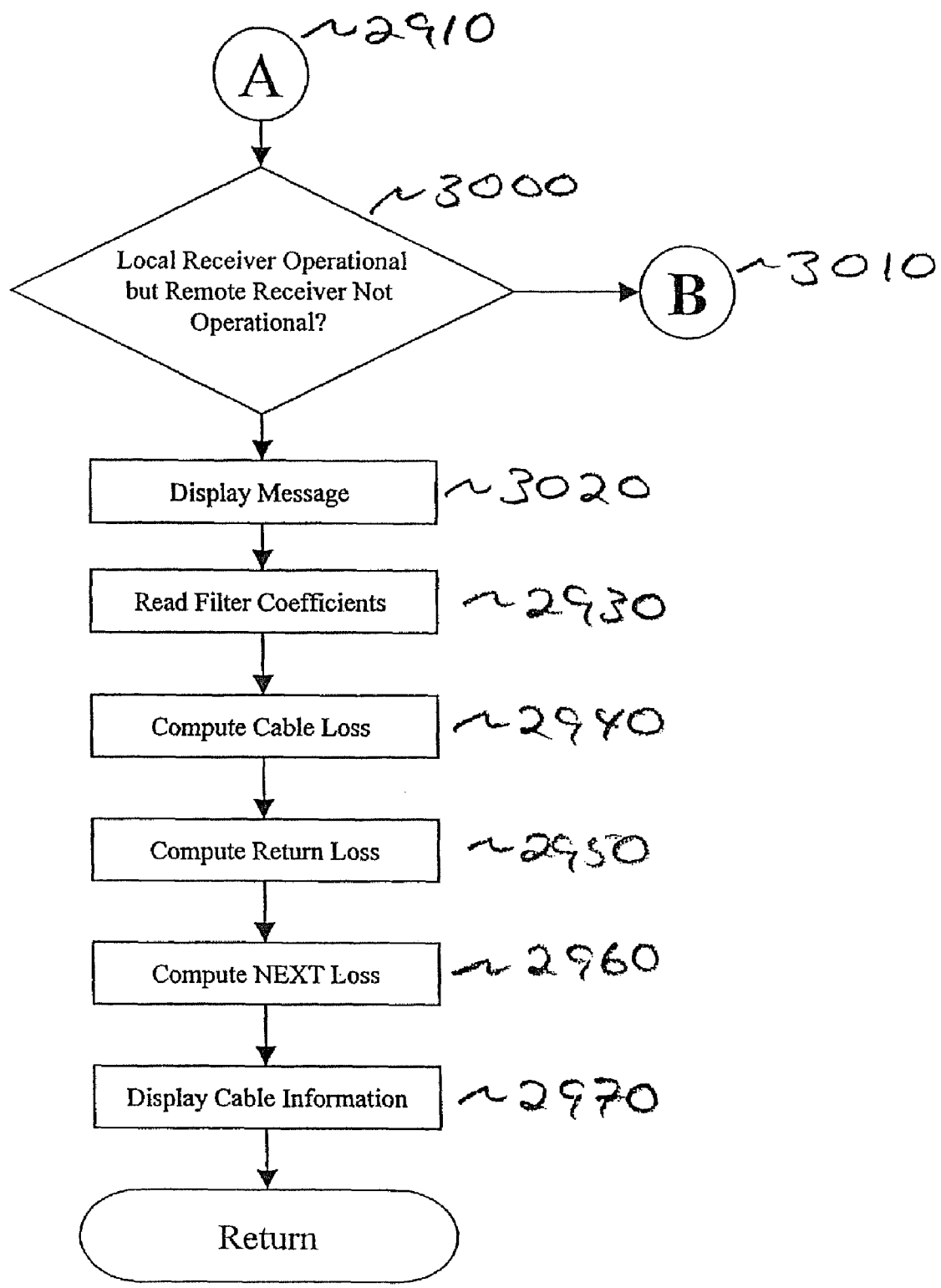
FIG. 18 is a flowchart of an exemplary embodiment of a diagnostic process when the local exemplary transceivers embodiment is operating normally but the remote exemplary transceivers embodiment is not.

If the best matched sequence is not the expected state machine sequence resulting from exemplary transceivers 102 and 104 (FIG. 10) operating normally, then control is transferred to another conditional test as shown by offsheet connector A 2910. Turning now to FIG. 18, offsheet connector A connects to conditional branch 3000. The diagnostic report function determines if the best matched expected state machine sequence is the expected state machine sequence when exemplary local transceiver 102 (FIG. 10) is operating normally but exemplary remote transceiver 104 (FIG. 10) is not responding. The diagnostic report function displays an error message at step 3020 and then calculates the condition of the transmission lines as previously described for steps 2930 to 2970.

Figure 19:
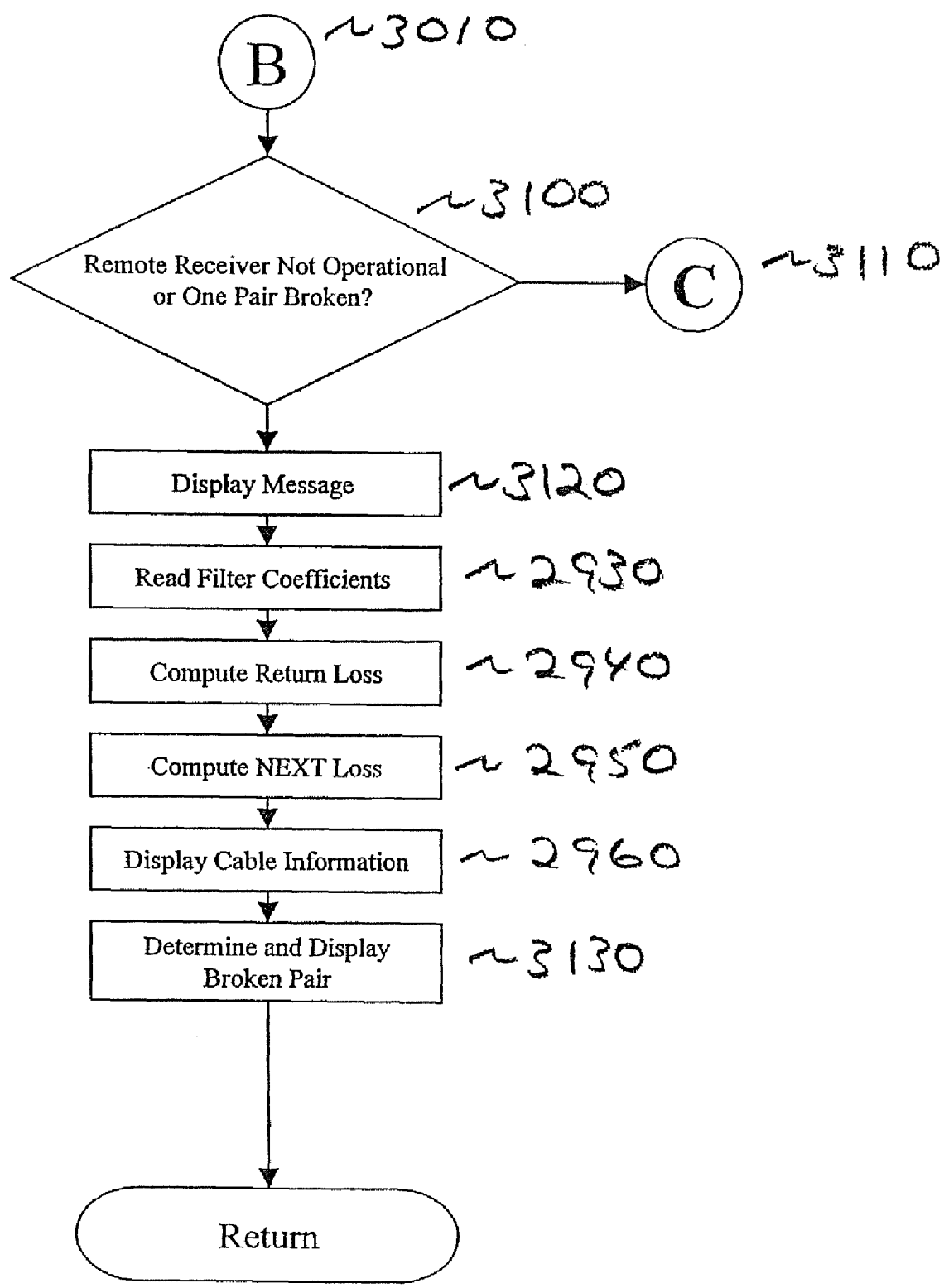
FIG. 19 is a flowchart of an exemplary embodiment of a diagnostic process when the local exemplary transceivers embodiment is operating normally but one or more of the transmission lines are broken.

If the best matched sequence is not the expected state machine sequence resulting from exemplary local transceiver 102 (FIG. 10) operating normally and exemplary remote transceiver 104 (FIG. 10) not operating normally, then control is transferred to another conditional test as shown by offsheet connector B 3010. Turning now to FIG. 19, offsheet connector B connects to conditional branch 3100. At conditional branch 3100, the diagnostic report function determines if the best matched expected state machine sequence is the expected state machine sequence when there is a broken pair in the transmission cable between exemplary transceivers 102 and 104 (FIG. 10). The diagnostic report function displays an error message indicating that there is a possible broken pair at step 3120. The diagnostic report function then calculates and displays the quality of the transmission cable as previously described in steps 2930 through 2960. The diagnostic report function then determines if there is actually a broken pair at step 3130.

Figure 20:
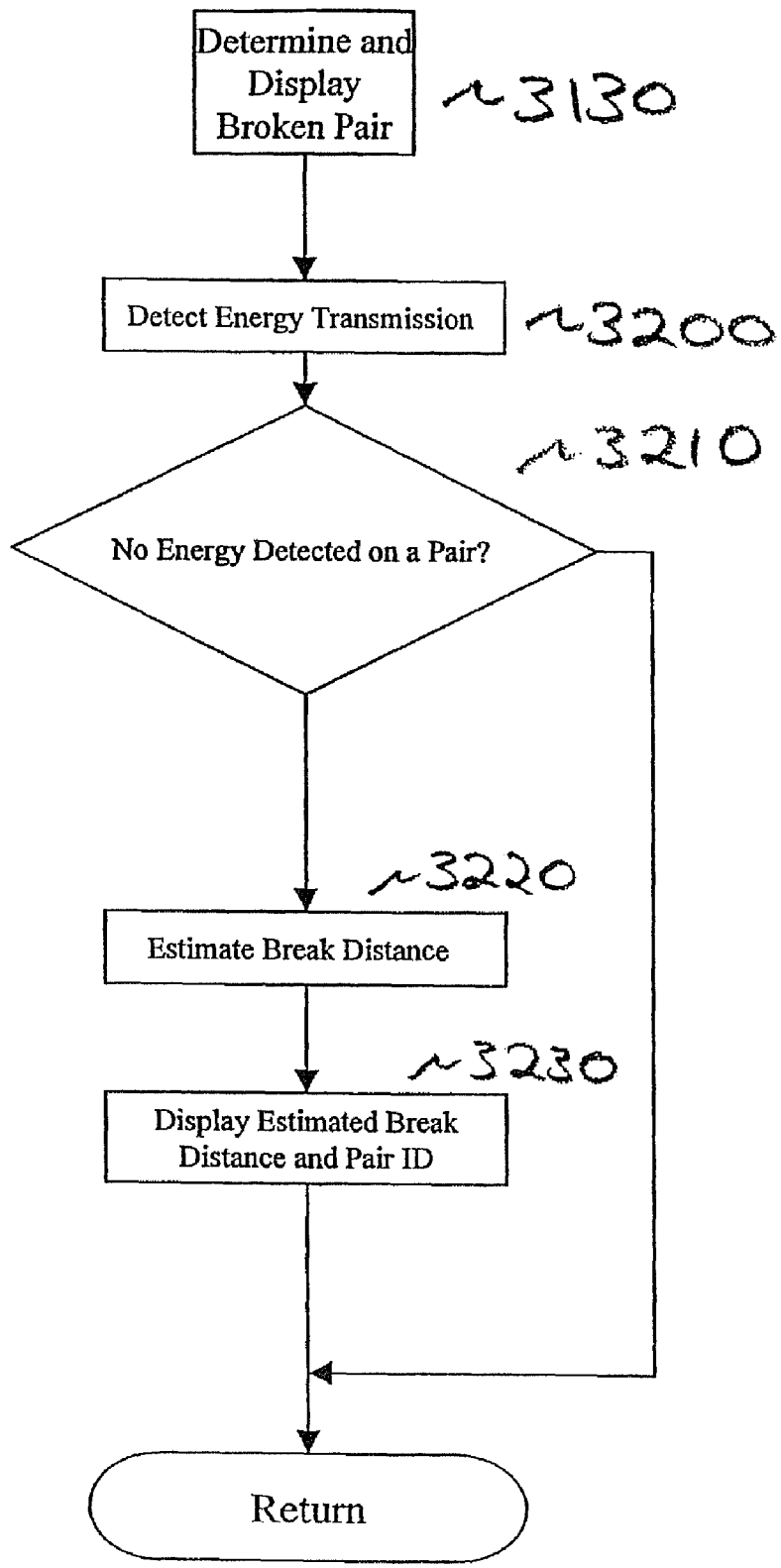
FIG. 20 is a flowchart of an exemplary embodiment of a process to detect a broken pair of transmission wires.

A flowchart for an exemplary broken pair determination function is shown in FIG. 20. The broken pair determination function queries local transceiver 102 (FIG. 10) and receives transmission energy level detection signals for each of the four twisted pairs within the transmission cable. The broken pair determination function then scans the returned values to see if there is a twisted pair for which no energy is detected at step 3210. The broken pair determination function then determines the distance to the break at step 3220 if there is a pair for which there is no transmission energy. The break distance is estimated using the same technique as in step 2940 (FIG. 17) for calculating cable length; however, the detected reflected signal is because of the break in the line and not because of impedance mismatches caused by normal line termination. The broken pair determination function displays the estimated break distance at step 3230 as well as the broken pair identification.

Figure 21:
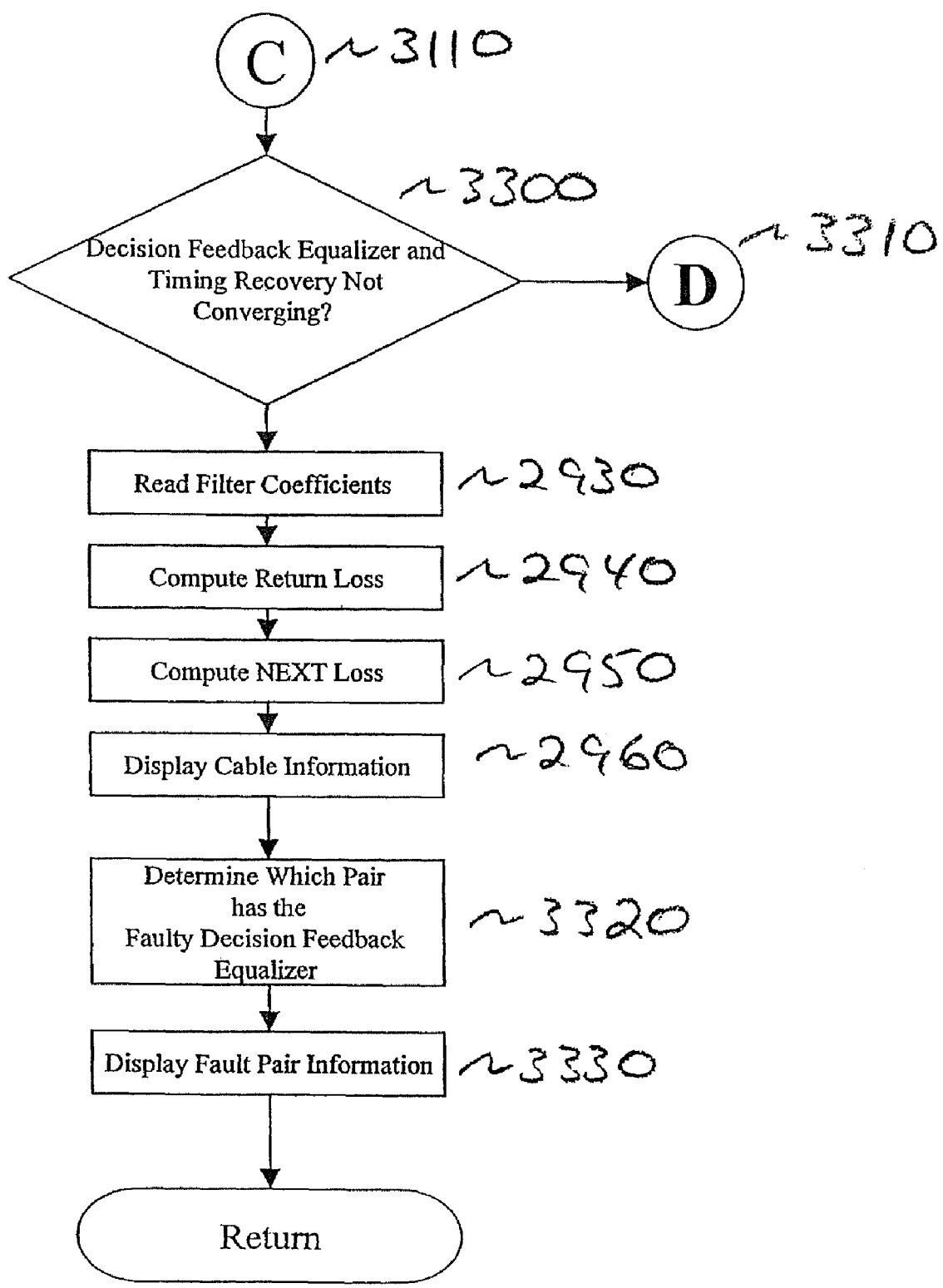
FIG. 21 is a flowchart of an exemplary embodiment of a diagnostic process when the adaptive filters of a local exemplary transceiver embodiment are not converging.

Returning now to FIG. 19, if the best matched sequence is not the expected state machine sequence resulting from a broken pair in the transmission line, then control is transferred to another conditional test as shown by offsheet connector C 3110. Turning now to FIG. 21, offsheet connector C connects to conditional branch 3300. At conditional branch 3300, the diagnostic report function determines if the best matched sequence is the expected state machine sequence when the DFE 312 (FIG. 12) or timing recovery circuit 222 (FIG. 11) of one of the four constituent transceivers 108 (FIG. 10) of the local transceiver 102 (FIG. 10) fails to converge. If a DFE or timing recover circuit fails to converge, then the diagnostic report function reads and reports on the cable characteristics in steps 2930 to 2960 as previously described.

Returning now to FIG. 14, four substrate machines are shown. Pair A substrate machine 1414, Pair B substrate machine 1416, Pair C substrate machine 1418, and Pair D substrate machine 1420. Each substrate machines correspond to one of the four constituent transceivers 108 (FIG. 10) of transceiver 102 (FIG. 10). The state sequences for each of these substrate machines may be analyzed in the same fashion as main state machine 1402 using sequence matching techniques to match expected state machine sequences to substrate machine sequences to determine error conditions. Returning now to FIG. 21, the diagnostic report function determines which of the four constituent transceivers have failed to converge by analyzing the substrate machine sequences of each of four substrate machines 1414, 1416, 1418, and 1420 (FIG. 14) at step 3320. The diagnostic report function reports which of the four constituent transceivers 108 (FIG. 10) has failed to converge at step 3330.

Figure 22:
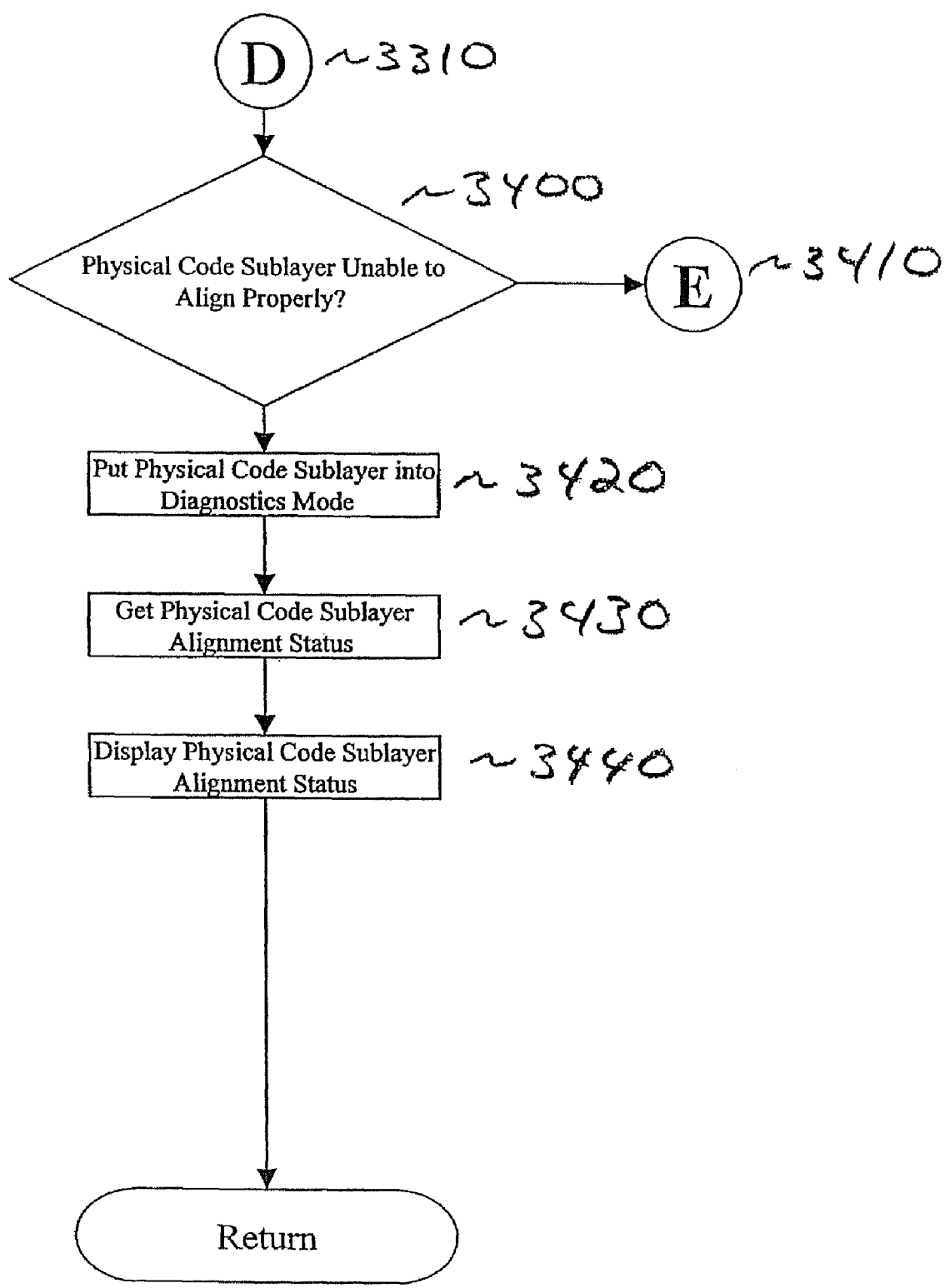
FIG. 22 is a flowchart of an exemplary embodiment of a diagnostic process when the physical code sublayer of an exemplary transceivers embodiment is unable to align the plurality of transceivers.

If the best matched sequence is not the expected state machine sequence resulting when DFE 312 (FIG. 12) or timing recovery circuit 222 (FIG. 11) of one of the four constituent transceivers 108 (FIG. 10) of the local transceiver 102 (FIG. 10) fails to converge, then control is transferred to another conditional test as shown by offsheet connector D 3310. Turning now to FIG. 22, offsheet connector D connects to conditional branch 3400. At conditional branch 3400, the diagnostic report function determines if the best matched expected state machine sequence is the expected state machine sequence when physical code sublayer 110 (FIG. 10) fails to align properly, if so, the diagnostic report function puts the physical code sublayer in diagnostics mode at step 3420. The diagnostic report function reads the physical code sublayer alignment status reported by the physical code sublayer at step 3430. The diagnostic report function displays the physical code sublayer alignment status at step 3440.

Figure 23:
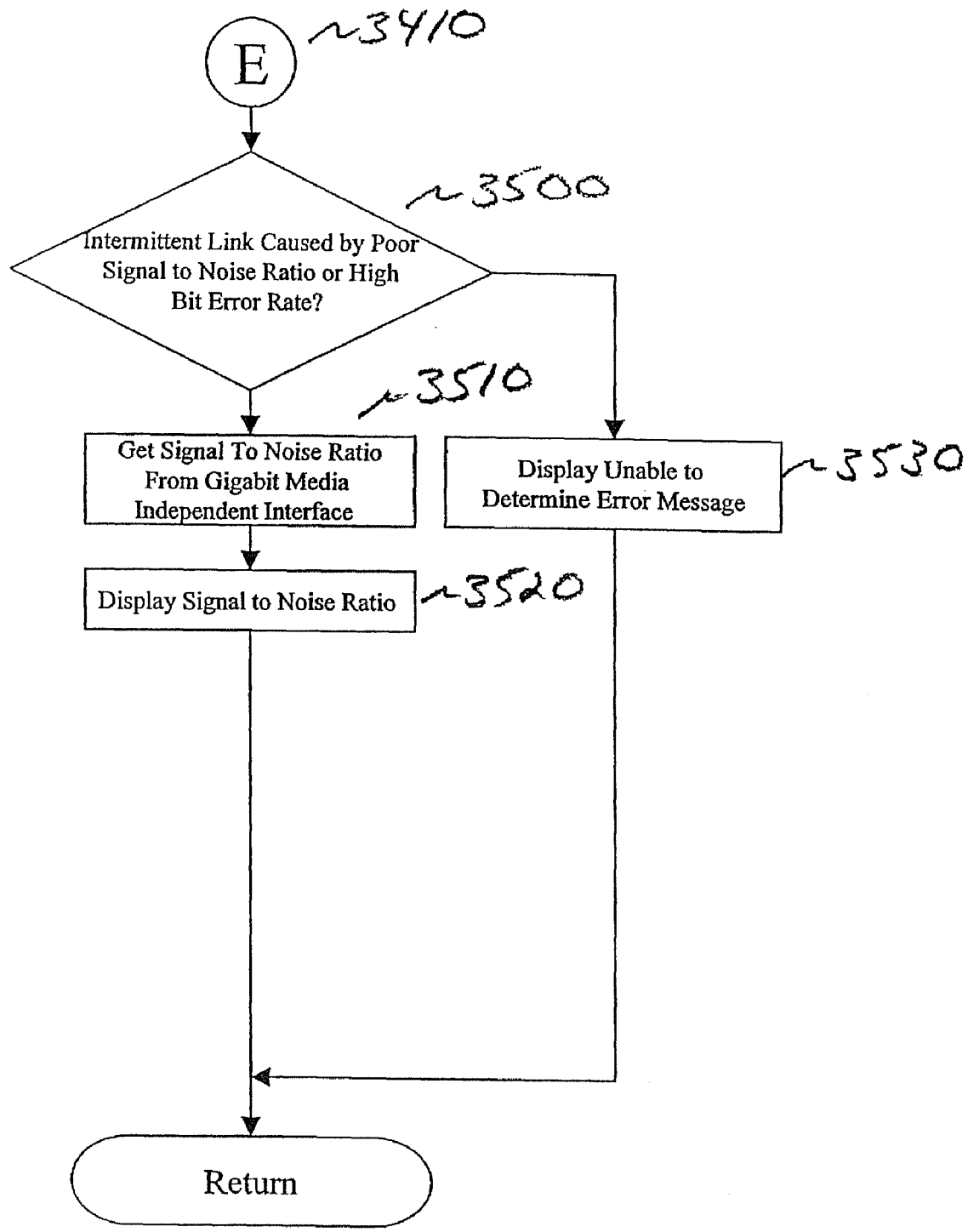
FIG. 23 is a flowchart of an exemplary embodiment of a diagnostic process when the when the local exemplary transceivers embodiment is experiencing intermittent failures.

If the best matched sequence is not the expected state machine sequence resulting when the physical code sublayer 110 (FIG. 10) fails to align properly, then control is transferred to another conditional test as shown by offsheet connector E 3410. Turning now to FIG. 23, offsheet connector E connects to conditional branch 3500. At conditional branch 3500, the diagnostic report function determines if the best matched expected state machine sequence is the expected state machine sequence when there is an intermittent link caused by poor signal to noise ratio or high bit error rates, if so, the diagnostic report function gets the signal to noise ratio from GMII 1314 (FIG. 13) at step 3510. The diagnostic report function displays the signal to noise ratio from step 3510 at step 3520. If there is no expected state machine sequence that matches the state machine sequence, then the diagnostic report function reports that the status of the transceiver cannot be determined at step 3530.

What is claimed is:

1. A communications system, comprising:
a transceiver;
a controller operatively coupled to a transceiver; and
a diagnostic system operatively coupled to the controller or to a memory that is operatively coupled to the controller;
wherein the diagnostic system is configured to record a state machine sequence generated by the controller,
wherein the diagnostic system is configured to select, from a plurality of expected state machine sequences, a particular expected state machine sequence that matches the state machine sequence, and
wherein the diagnostic system is configured to determine a status of the transceiver based on the selected expected state machine sequence.

2. The system according to claim 1, wherein the diagnostic system is configured to normalize the plurality of expected state machine sequences based on a sample frequency of the state machine sequence.

3. The system according to claim 2, wherein the diagnostic system is configured to match the selected expected state machine sequence to the state machine sequence using an approximate string matching algorithm.

4. The system according to claim 3, wherein the diagnostic system is configured to obtain adaptive data from the transceiver, and wherein the diagnostic system is configured to determine the status of external systems using the adaptive data.

5. The system according to claim 1, wherein the diagnostic system is configured to read filter coefficients from the transceiver.

6. The system according to claim 5, wherein the diagnostic system is configured to calculate a quality of a communication channel based using the filter coefficients.

7. The system according to claim 6, wherein the diagnostic system is configured to diagnose faults in the communication channel based on at least the selected expected state machine sequence and the filter coefficients.

8. The system according to claim 5, wherein the diagnostic system is configured to calculate a communication channel pulse response using the filter coefficients.

9. The system according to claim 8, wherein the diagnostic system is configured to calculate a communication channel frequency response using at least the communication channel pulse response.

10. The system according to claim 9, wherein the diagnostic system is configured to calculate a communication channel transfer function.

11. The system according to claim 10, wherein the diagnostic system is configured to compare the communication channel transfer function to a standard communication channel transfer function.

12. The system according to claim 1, wherein the state machine sequence is generated by the controller during operation and is indicative of the status and operation of the transceiver.

13. The system according to claim 1, wherein the controller comprises a state machine that controls the transceiver.

14. The system according to claim 1, wherein the diagnostic system is configured to diagnose faults in a communication channel based on at least the selected expected state machine sequence and filter coefficients.

15. The system according to claim 1, wherein the state machine is configured to control an initialization of the transceiver.

16. The system according to claim 1, wherein the transceiver comprises a plurality of transceivers used in a Gigabit Ethernet.

17. The system according to claim 1, wherein the diagnostic system is configured to select, from the plurality of expected state machine sequences, the particular expected state machine sequence using approximate string matching techniques.

18. The system according to claim 1, wherein the transceiver comprises a plurality of transceivers used in a 1000 Base-T communications system or a 100 Base-TX communications system.

19. The system according to claim 1, wherein the transceiver is a Gigabit transceiver.

20. The system according to claim 1, wherein the transceiver transmits and receives symbol data.

* * * * *